United States Patent
Nomura et al.

(10) Patent No.: US 7,538,330 B2
(45) Date of Patent: May 26, 2009

(54) RADIATION DETECTION APPARATUS AND SCINTILLATOR PANEL

(75) Inventors: Keiichi Nomura, Honjo (JP); Kazumi Nagano, Fujisawa (JP); Yoshihiro Ogawa, Hachioji (JP); Satoshi Okada, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/680,736

(22) Filed: Mar. 1, 2007

(65) Prior Publication Data

US 2008/0083877 A1 Apr. 10, 2008

(30) Foreign Application Priority Data

| Mar. 2, 2006 | (JP) | 2006-056472 |
| Mar. 2, 2006 | (JP) | 2006-056474 |
| Jul. 26, 2006 | (JP) | 2006-203161 |
| Feb. 27, 2007 | (JP) | 2007-046715 |

(51) Int. Cl.
G01T 1/20 (2006.01)
G01T 1/202 (2006.01)

(52) U.S. Cl. ............ 250/370.11; 250/367; 250/486.1; 250/487.1

(58) Field of Classification Search .......... None
See application file for complete search history.

(56) References Cited

U.S. PATENT DOCUMENTS

| 4,820,926 | A | * | 4/1989 | Popma et al. ............ 250/486.1 |
| 5,241,180 | A | * | 8/1993 | Ishaque et al. ........... 250/361 R |
| 7,205,547 | B2 | | 4/2007 | Ishii et al. .............. 250/370.09 |
| 7,205,568 | B2 | | 4/2007 | Watanabe et al. ............ 257/59 |
| 7,256,404 | B2 | | 8/2007 | Inoue et al. ............. 250/370.11 |
| 2003/0116715 | A1 | * | 6/2003 | Homme et al. ......... 250/370.11 |
| 2004/0164277 | A1 | * | 8/2004 | Yen et al. .............. 252/301.4 R |
| 2006/0013966 | A1 | * | 1/2006 | Konincks et al. ........... 427/593 |
| 2006/0033031 | A1 | | 2/2006 | Takeda et al. .......... 250/370.11 |
| 2006/0033040 | A1 | | 2/2006 | Okada et al. ............. 250/484.2 |

(Continued)

FOREIGN PATENT DOCUMENTS

JP 2002-31687 1/2002

(Continued)

OTHER PUBLICATIONS

Schotanus, R. et al., "Scintillation characteristics of pure and Tl-doped CsI Crystals", IEEE Transactions of Nuclear Science, vol. 37, No. 2, pp. 177-182 (Apr. 1990).

*Primary Examiner*—David P Porta
*Assistant Examiner*—Yara B Green
(74) *Attorney, Agent, or Firm*—Fitzpatrick, Cella, Harper & Scinto

(57) ABSTRACT

A radiation detection apparatus includes an optical detector disposed on a substrate and having a plurality of photoelectric conversion elements which convert light into an electrical signal, and a scintillator layer disposed on the optical detector and having a columnar crystal structure which converts radiation into light, wherein the concentration of an activator of the scintillator layer is higher at the radiation-incident side opposite the optical detector and is lower at the optical detector side. The scintillator panel includes the substrate and the scintillator layer disposed on the substrate, wherein the concentration of the activator of the scintillator layer is higher at the radiation-incident side and is lower at the light-emission side.

19 Claims, 13 Drawing Sheets

U.S. PATENT DOCUMENTS

| | | | |
|---|---|---|---|
| 2006/0062352 A1 | 3/2006 | Nomura et al. | 378/98.8 |
| 2006/0065944 A1 | 3/2006 | Mochizuki et al. | 257/444 |
| 2006/0249763 A1 | 11/2006 | Mochizuki et al. | 257/291 |
| 2007/0045556 A1 | 3/2007 | Watanabe et al. | 250/370.14 |
| 2007/0051896 A1 | 3/2007 | Okada et al. | 250/370.11 |
| 2007/0069107 A1 | 3/2007 | Ishii et al. | 250/208.1 |
| 2007/0131867 A1 | 6/2007 | Okada et al. | 250/370.09 |
| 2007/0145285 A1 | 6/2007 | Ishii et al. | 250/370.11 |
| 2007/0146520 A1 | 6/2007 | Watanabe et al. | 348/308 |

FOREIGN PATENT DOCUMENTS

| | | |
|---|---|---|
| WO | WO 98/36290 | 8/1998 |

* cited by examiner

RADIATION DETECTION APPARATUS AND SCINTILLATOR PANEL

BACKGROUND OF THE INVENTION

1. Field of the Invention

The present invention relates to a method for producing a scintillator panel, radiation detection apparatus, radiation detection system and scintillator layer, which are applied to a medical diagnostic imaging apparatus, non-destructive inspection apparatus, analytical apparatus, and the like. In particular, the invention relates to a scintillator panel, radiation detection apparatus, radiation detection system, and method for producing the scintillator layer, which are used for x-ray photography and the like. Incidentally, in the present specification, the category of radiation also includes corpuscular rays such as x-rays, $\alpha$-ray, $\beta$-ray, $\gamma$-rays, and the like. As a detector for detecting radiation, a flat panel detector (hereinafter, abbreviated as "FPD") is known. This combines an optical detector two-dimensionally disposed with a photoelectric conversion element using amorphous silicon (hereinafter, abbreviated as "a-Si") and a TFT element with a scintillator converting radiation into light of a waveband sensible by the photoelectric conversion element.

2. Description of the Related Art

Nowadays, as recent TFT technologies for liquid crystal displays and maintenance of information infrastructures have come to be well developed, a variety of FPDs have been proposed, and even in the field of medical diagnostic images, a large display area and digitalization have been achieved.

Such FPDs can instantaneously read a radiation image and instantaneously display it on a display unit. Further, since the image can be directly taken out as digital information, the FPD is characterized by easiness of handling such as storing, processing, or transferring data. Further, though various characteristics such as sensitivity depend on imaging conditions, as compared with a conventional screen film system imaging method and a computed radiographic imaging method, such characteristics are confirmed to be equal to or superior to these methods.

As a digital radiation detection apparatus used for the FPD, there is an apparatus combined with a photoelectric detector which takes a phosphor that converts radiation into visible light and the like as a phosphor layer (scintillator layer) made of cesium iodide (hereinafter, referred to as "CsI") in which a crystal grows columnar. To increase sensitivity of such radiation detection apparatus, an activator such as thallium (Tl) and sodium (Na) is added to the CsI of the phosphor layer. As compared with phosphor layers containing conventional particulate crystal phosphors, sensitivity and sharpness are dramatically improved.

International Publication No. WO98/36290 discloses a radiation detection apparatus used in such an FPD.

FIG. 5B of IEEE TRANSACTION ON NUCLEAR SCIENCE Vol. 37, No. 2, April 1990, p. 177-182, discloses that an increase in the concentration of an activator Ti increases the light-emission quantity, and with a certain concentration or more, the light-emission quantity is saturated.

On the other hand, though not using the scintillator layer to convert radiation into direct light, Japanese Patent Application Laid-Open No. 2003-50298 discloses a radiation image conversion panel using an accumulative phosphor.

The phosphor layer includes a layer made of a phosphor main ingredient component at a support medium side and a layer made of a phosphor component (main ingredient component and activator component) at a surface side, and a columnar crystal structure of each layer is formed by a vapor deposition method.

In Japanese Patent Application Laid-Open No. H10-223163, the scintillator layer is formed on a substrate surface of an x-ray image tube and a photoelectrode is formed on that layer. The scintillator is formed in two layers on a substrate, and the columnar diameter of the scintillator layer at an x-ray incident side is made smaller.

Japanese Patent Application Laid-Open No. 2002-31687 discloses a columnar crystal in which the scintillator layer is different in shape from a photosensor portion between the photosensor portion and a TFT portion.

SUMMARY OF THE INVENTION

However, in the scintillator of the conventional radiation detection apparatus, when the concentration of the activator is increased in order to increase the light-emission quantity, there has been a problem that the sharpness is reduced.

In the radiation detection apparatus using CsI for the scintillator layer that converts radiation into direct light, when a Tl-doped CsI (hereinafter, referred to as "CsI:Tl") increases its concentration, it absorbs emitted light. In particular, when the film thickness is increased in order to increase the light-emission quantity, the light-emission quantity is actually reduced for the following reasons.

1. The x-rays of an energy used for radiography are strongly absorbed by CsI:Tl at the x-ray incident side.

For example, when an absorption coefficient of the x-ray is calculated by a CsI mass attenuation coefficient at the time of 60 KeV, approximately 43% of the x-ray radiation is absorbed at thickness of 200 μm. A film thickness of CsI used by the FPD is usually approximately 400 to 600 μm. For example, in the case of thickness of 600 μm, approximately 43% of the x-rays is absorbed in the initial 200 μm, and approximately 24.55% in the next 200 μm, and then, approximately 12.8% in the last 200 μm.

2. While the emitted light passes through the columnar CsI as through a waveguide, the light is absorbed into the CsI when the Tl concentration is high. Particularly, since the light emits much at the x-ray incident side, attenuation of the light by absorption is large.

For example, in the emission center wavelength 550 nm of the CsI:Tl, when transmittance is taken as 1 when the Tl concentration is 2.51 mol %, it becomes 5.8 times that at the time of 0.35 mol %, 4.6 times that at the time of 0.7 mol %, and 3.5 times that at the time of 1.49 mol %. That is, when the Ti concentration is higher, the transmittance becomes lower.

Consequently, when the film thickness of the CsI:Tl is made large, absorption and emission of the x-rays mainly occur in the CsI:Tl at the incident side of the x-rays. The light emitted inside the CsI:Tl at the incident side of the x-rays is absorbed and attenuated while passing through the CsI:Tl. When the Tl concentration is attenuated in order to decrease the amount of light absorption inside the CsI:Tl, however, the light-emission quantity is decreased. This results in a trade-off relationship that, when the film thickness of the CsI:Tl is decreased, the light-emission quantity is decreased.

Further, in order to increase the light-emission quantity, annealing is performed after vapor deposition. However, there exists a trade-off relationship that, when annealing is performed, though the light-emission quantity is increased, the modulation transfer function ("MTF") characteristic which is an index of sharpness is reduced.

Hence, an object of the present invention is to propose a concentration in a thickness direction of the most suitable activator to be the maximum in a light-emission quantity without reducing the film thickness, and at the same time, to provide improvement of MTF characteristics.

A radiation detection apparatus according to the present invention includes: an optical detector having a plurality of photoelectric conversion elements which are disposed on a substrate and convert light into an electrical signal; and a scintillator layer having a columnar crystal structure which is disposed on the optical detector and converts radiation into light, where the concentration of the activator in the scintillator layer is higher at the radiation incident side opposite the optical detector and is lower at the optical detector side.

A scintillator panel of the present invention includes a substrate and a scintillator layer having a columnar crystal structure which is disposed on the substrate and converts radiation into light, where radiation is incident from one surface side of the scintillator layer and light is emitted from the other surface side, and where the concentration of the activator in the scintillator layer is higher at the radiation incident side and is lower at the light-emission side.

In the present invention, a reduction of the concentration of the activator of the scintillator layer from the radiation-incident side to the light-emission side can improve the light emission quantity and the MTF characteristic at the same time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The best mode for carrying out the present invention will be described below in detail with reference to the drawings. Incidentally, an optical detector in which a plurality of photoelectric conversion elements which convert light into an electrical signal and a TFT element are two-dimensionally disposed on a substrate is described as a sensor substrate (sensor panel). Further, in the radiation detection apparatus of the present invention, an electrode takeoff portion (not illustrated) of a sensor substrate 1 is adhered with a terminal portion of a flexible circuit board (not illustrated) mounted with a drive or detection integrated circuit IC through an anisotropic conductive adhesive (not illustrated).

In the present embodiment, a description will be made of the case where a photoelectric conversion element portion including a photosensor using amorphous silicon and a TFT is formed on a glass substrate as a sensor substrate. On the other hand, by using a semiconductor monocrystalline substrate forming an image pick-up device two-dimensionally disposed with CCD, CMOS sensor, and the like, a ground layer and a scintillator layer are disposed on that substrate, so that the radiation detection apparatus can also be suitably formed.

Further, while description has been made of a substrate in which the TFT and the photoelectric conversion element are formed so as to line up on the same surface on the glass substrate as a sensor substrate, a sensor substrate having a switch element such as the TFT on the glass substrate, an insulating layer on the switch element and a photoelectric conversion element formed on the insulating layer can also be used. Also, in such a sensor panel, a photoelectric conversion layer (semiconductor layer) of the photoelectric conversion element is not laminated on the TFT, and a defect-site generated on the TFT and the like may be repaired by using a laser beam. Further, there is a configuration in which the photoelectric conversion layer (semiconductor layer) of the photoelectric conversion element is laminated on the TFT also, thereby improving the aperture ratio.

First Embodiment

A radiation detection apparatus of a first embodiment of the present invention will be described.

Figure 1:
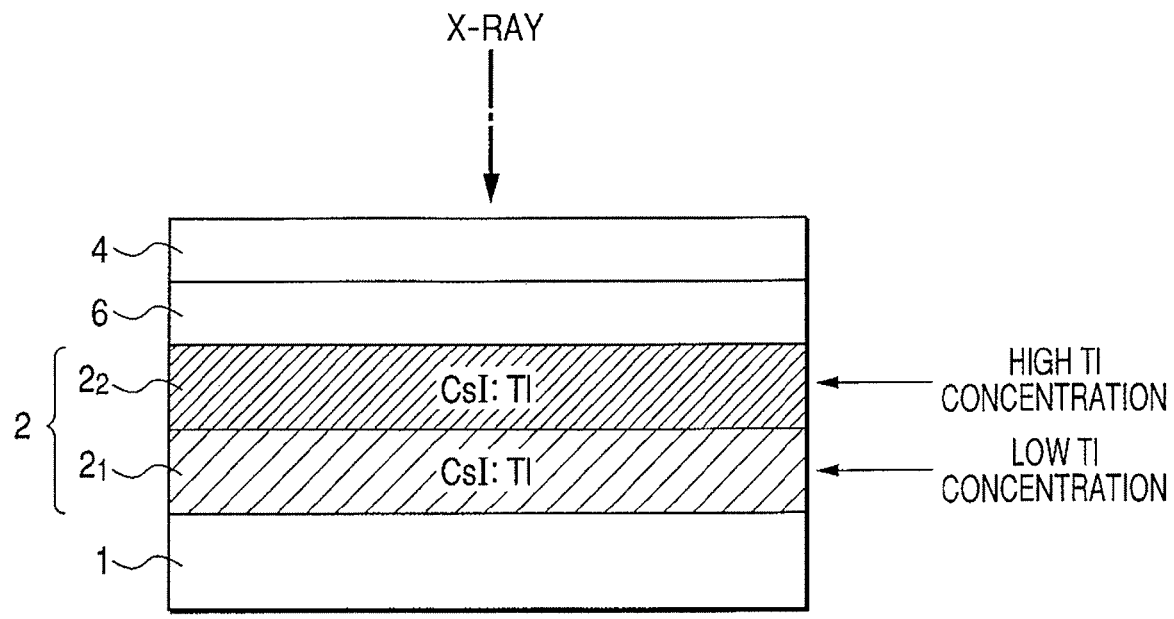
FIG. 1 is a schematic sectional view of a radiation detection apparatus according to a first embodiment of the present invention.

FIG. 1 is a schematic sectional view of the radiation detection apparatus in the first embodiment.

The present embodiment is an example on a direct type in which a scintillator layer 2 on a sensor substrate 1 is directly evaporated.

The sensor substrate 1 is formed with a photoelectric conversion element and a switch element such as TFT, which are two-dimensionally disposed. The sensor substrate 1 is formed with an adhesive layer 6 including scintillator layers 2 ($2_1$ and $2_2$), a binding adhesive (such as epoxy resin), a adhesive, a hot melt, and the like, and a protective layer 4 of metal (such as Al, stainless, titanium oxide, and copper alloy). The scintillator layer 2 is an alkaline halide crystal to which has been added an activator such as CsI:Tl and CsI:Na. The protective layer 4 doubles as a reflecting layer for reflecting light from the scintillator layer 2. The radiation is incident from the surface opposite the sensor substrate 1 of the scintillator layer 2. That is, the radiation is incident from the upper portion of the protective layer 4, and is absorbed into the scintillator layer 2 so as to be converted into visible light.

The scintillator layer 2 includes two layers. The scintillator layer $2_1$ is a layer mainly deciding an MTF, and the scintillator layer $2_2$ is a layer that mainly determines the light-emission quantity.

As an activator, thallium (Tl) is used, and the concentrations vary as follows. The concentration of the activator in the scintillator layer 2 gradually decreases from the radiation-incident side to the optical detector side (or increases gradually from the optical detector side to a radiation-incident side). In each of the scintillator layer $2_2$ and scintillator layer $2_1$, though the concentration of the activator remains constant, it has a relationship of concentration in the scintillator layer $2_2$>concentration in the scintillator layer $2_1$.

Figure 2:
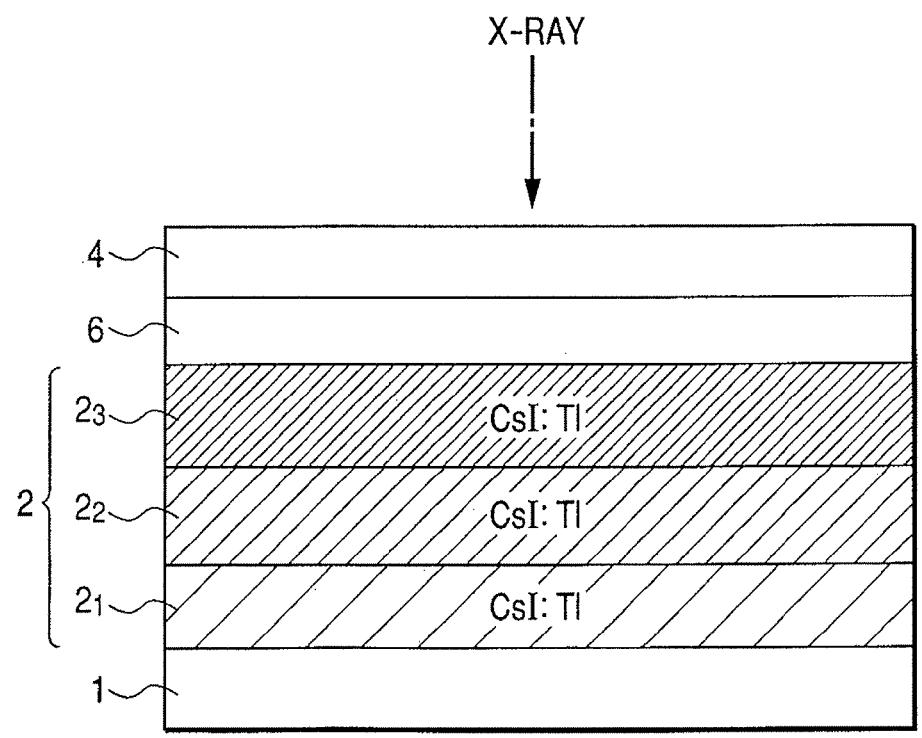
FIG. 2 is a schematic sectional view of another example of the radiation detection apparatus.

FIG. 2 is a schematic sectional view of another example of the radiation detection apparatus in the first embodiment.

The scintillator layer 2 may include a multi-layer structure of three layers or more, and for example, in the case of the three-layer configuration as illustrated in FIG. 2, the concentration of the activator has a relationship of concentration in scintillator layer $2_3$>concentration in the scintillator layer $2_2$>concentration in the scintillator layer $2_1$.

Next, a method for producing the scintillator layer of the radiation detection apparatus illustrated in the first embodiment of the present invention will be described.

Figure 3:
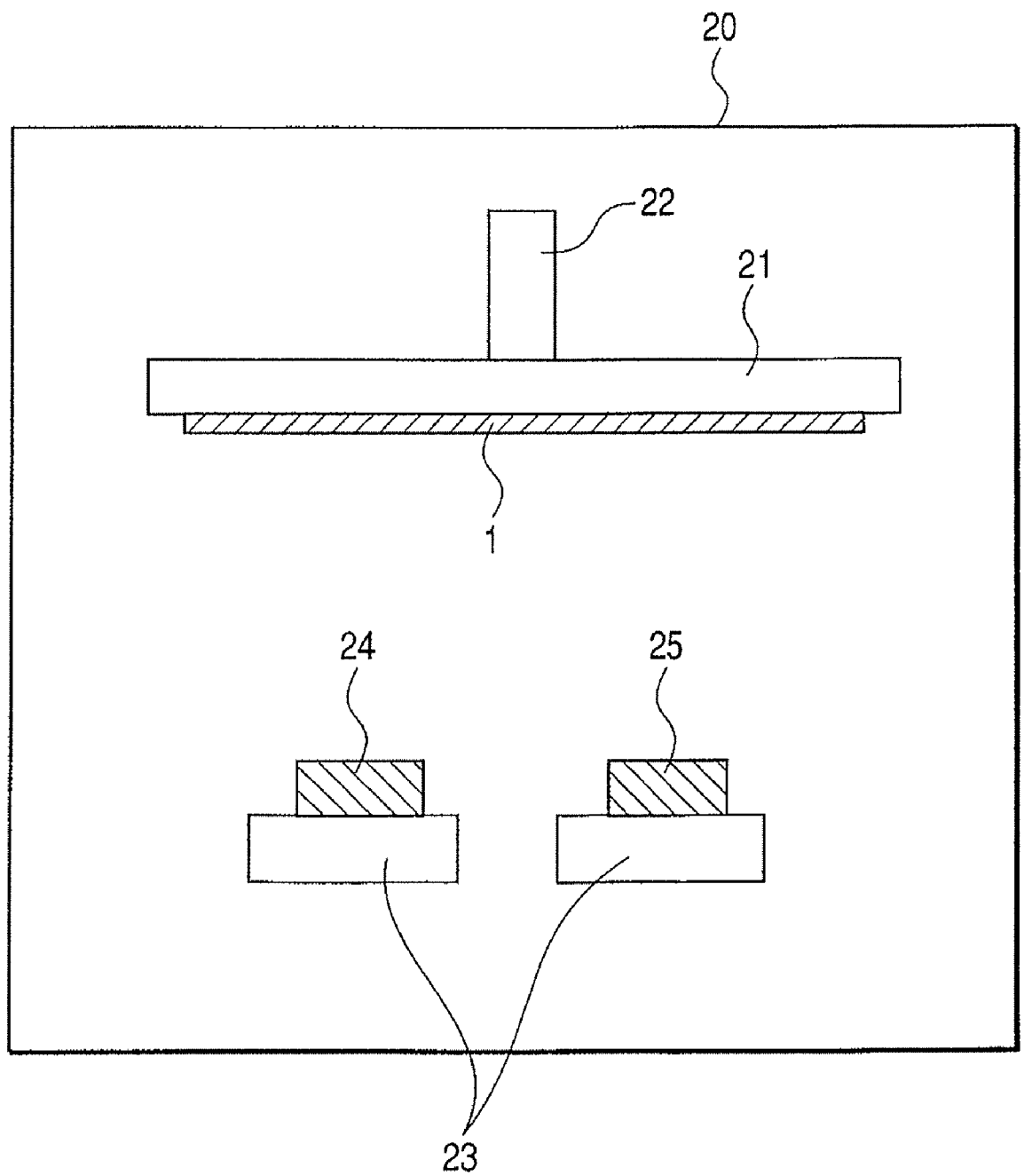
FIG. 3 is a schematic sectional view illustrating a production unit of a scintillator layer of the radiation detection apparatus.

FIG. 3 is a schematic sectional view illustrating a production unit of the scintillator layer of the radiation detection apparatus in the first embodiment.

The method for producing the scintillator layer is as follows.

A vapor deposition of the scintillator layer (CsI:Tl) is performed by vapor co-deposition of a main ingredient (CsI) and a doping material (TlI). The sensor substrate 1 is set to a substrate holder 21 in a state in which a light receiving surface looks downward. The inside of a vacuum chamber 20 of a vapor deposition apparatus is evacuated, and after that, the vapor deposition is performed, while rotating the substrate by an axis of rotation 22 with a center of the sensor substrate 1 as an axis.

The CsI and TlI which are raw materials are put into a separate boat, respectively, and are preheated up to a predetermined temperature by a vapor deposition heating source 23 until the vapor deposition starts. During preheating, an unillustrated shutter or the like is used so that the vapor deposition material does not reach the substrate. At the same time as the vapor deposition starts, and the shutter is opened. The power applied to the CsI boat 24 during the vapor deposition is held constant, and the power applied to the TlI boat 25 is changed, thereby controlling the Tl concentration. That is, when the Tl concentration is to be increased, the power applied to the TlI boat is increased, and when the concentration is to be decreased, the power is decreased, so that the Tl concentration in the CsI film can be controlled.

A region (scintillator layer $2_2$) of the Tl high concentration is preferably not less than 0.7 mol %. When considering fluctuation in the production, the Tl concentration is preferably not less than 0.8 mol %. If the Tl concentration is not more than 0.7 mol %, this is a region where the light-emission quantity is reduced when there is a reduction in the Tl concentration.

In addition to the method for individually controlling the heating power of each boat, there is another method for changing the Ti concentration, in which Argon (Ar) gas is introduced into a vacuum chamber, and the pressure inside the vacuum chamber during vapor deposition is adjusted. In the present experiment, though Ar is used, an inactive gas such as Helium (He) or Neon (Ne), or a mixed gas of inactive gases, can be used. Since the lower the vapor deposition pressure is, the more easily the TlI of the raw material tends to sublime, the adjustment of the pressure inside the vacuum chamber during vapor deposition is performed such that, when the Tl concentration is to be made higher, the evaporation pressure is made lower, and when the Tl concentration is to be made lower, the evaporation pressure is made higher. As the pressure condition when the Tl concentration is high (the Tl concentration is not less than 0.7 mol %, and preferably not less than 0.8 mol %), it is not less than 0.01 Pa and not more than 1.0 Pa, and is preferably not less than 0.05 Pa and not more than 0.25 Pa. As the pressure condition when the Tl concentration is low (the Tl concentration is not more than 1.5 mol %), it is not less than 0.1 Pa and not more than 2.0 Pa, and is preferably not less than 0.15 Pa and not more than 1.2 Pa.

At this time, though a vapor deposition rate of the CsI evaporated at the same time changes, the power applied to the CsI boat may be adjusted such that the vapor deposition rate of the CsI during vapor deposition of the scintillator layer $2_1$ and the scintillator layer $2_2$ is made constant even if the evaporation pressure is changed.

When the Tl concentration is changed, the two methods as described here may be combined. That is, it is a method for changing both the pressure during vapor deposition of the scintillator layer $2_1$ and the scintillator layer $2_2$ and the power applied to the TlI boat.

Next, to increase the light-emission quantity after the vapor deposition, an annealing treatment is performed by means of an oven or the like. As the annealing conditions, the temperatures are 100° C. to 400° C. for one to eight hours, and the annealing atmosphere is nitrogen, vacuum or air. At this time, when annealing is performed at not less than 100° C., an endothermic reaction is caused, the CsI:Tl is dissolved, and gaps between CsI columns are reduced. That is, MTF characteristics become worse. However, when the Tl concentration is not more than 1.5 mol %, this endothermic reaction is inhibited, and by means of a differential scanning calorimeter ("DSC", Model Q-1000 made by TA Instruments, Japan) analysis, we found that the endothermic reaction is not produced when the Tl concentration is not more than 0.1 mol %.

That is, the Ti concentration of the scintillator layer $2_1$ is made not more than 1.5 mol % and preferably not more than 1.0 mol %, so that the light emission quantity is increased, while improving the MTF characteristics at the same time.

Preferably, the Ti concentration of the scintillator layer $2_1$ is not less than 0.3 mol %, which is a concentration lower than the scintillator layer $2_2$, and the Tl concentration of the scintillator layer $2_2$ is not less than 0.7 mol %.

More preferably, the Tl concentration of the scintillator layer $2_1$ is not less than 0.3 mol % and not more than 1.0 mol %, which is a concentration lower than the scintillator layer $2_2$, and the Tl concentration of the scintillator layer $2_2$ is not less than 0.7 mol % and not more than 1.5 mol %.

More preferably, the Tl concentration of the scintillator layer $2_1$ is not less than 0.3 mol %, and is smaller than 0.7 mol %, and the Tl concentration of the scintillator layer $2_2$ is not less than 0.7 mol % and not more than 1.0 mol %.

Next, a method for measuring the concentration of an activator will be described. The concentration of the activator is measured by an inductively-coupled-plasma optical emission spectrometry method ("ICP-OES", using Model SPS3 100, made by Seiko Instrument Inc.). A description will be made on the case where the scintillator layer 2 is made of three layers.

First, a method for micronizing an vapor deposition film will be described. A CsI film is formed approximately 600 μm on the substrate by vacuum vapor deposition. A film of CsI:Tl is shaved approximately 100 μm from an vapor deposition ending surface by means of a cutter so as to be micronized. The micronized CsI:Tl is taken out on a drug packing paper. This operation is repeated six times. The micronized CsI films of the first time and second time from the vapor deposition ending surface are used to measure the upper part concentration. In like manner, the micronized CsI films of the third time and fourth time from the vapor deposition ending surface are used to measure the middle part concentration, and the micronized CsI films of the fifth time and sixth time from the vapor deposition ending surface are used to measure the lower part concentration. Here, for convenience, the vapor deposition starting surface is referred to sometimes as the "lower" part, and the vapor deposition ending surface is referred to as the "upper" part. At this time, the weight of the micronized CsI:Tl film is allowed to be approximately 0.1 to 0.2 g. Mass is measured to four decimal places by a pair of scales.

In the present embodiment, to obtain an accurate measurement of the Ti concentration, an average Ti concentration per 100 μm in thickness is measured. Consequently, a change in the Ti concentration from the incident side of radiation is a change in the average value per 100 μm. The film thickness to be micronized is not necessarily 100 μm, but the area to be shaved may be increased with the thickness taken as 50 μm, and depending on capability of a measuring device, a thin film thickness can be approximately 10 μm, and a predetermined film thickness can be selected.

Next, a method for liquefying the micronized CsI:Tl film will be described. The weight of the micronized CsI:Tl film is measured, and after that, it is put into a 100 ml beaker. Next, by using a measuring pipet, a commercially available nitric acid (super-fine quality, 69%) is put into a 30 ml beaker. A 100 ml beaker is placed on a hot plate, and the heating of a liquid solution is performed. Iodine ($I_2$) is evaporated, and is heated until it becomes transparent and colorless.

Iodine is evaporated and vaporized by the following chemical changes:

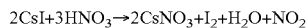

$2CsI+3HNO_3 \rightarrow 2CsNO_3+I_2+H_2O+NO_2$

$2TlI+3HNO_3 \rightarrow 2TlNO+I_2+H_2O+NO_2$

The liquid solution which has become transparent is transferred into a 50 ml measuring flask. At this time, the 100 ml beaker used for heating is cleansed by distilled water two times or more. At this time, though the temperature increases due to heat generation, the distilled water is added, and the whole amount is made 50 ml at room temperature.

Next, a method for preparing the standard solution for calibration curve preparation will be described. 1 ml and 10 ml of commercially available thallium standard solution (concentration 1000 ppm, for example, obtainable from Kanto Chemical Co. Inc.) for the use of atomic absorption are put into the 100 ml measuring flask respectively. The distilled water is added, and the whole amount is made 100 ml. This is made into standard solutions of 10 ppm and 100 ppm in concentration, respectively. As a standard solution of 0 ppm in concentration, the distilled water is used as it is.

After that, by using the prepared sample, measurement is performed by means of an analyzer.

As the material of another scintillator layer other than CsI, NaI and the like are also included. Further, as the activator, sodium (Na) and the like can also be used.

Second Embodiment

A radiation detection apparatus of a second embodiment of the present invention will be described.

Figure 4:
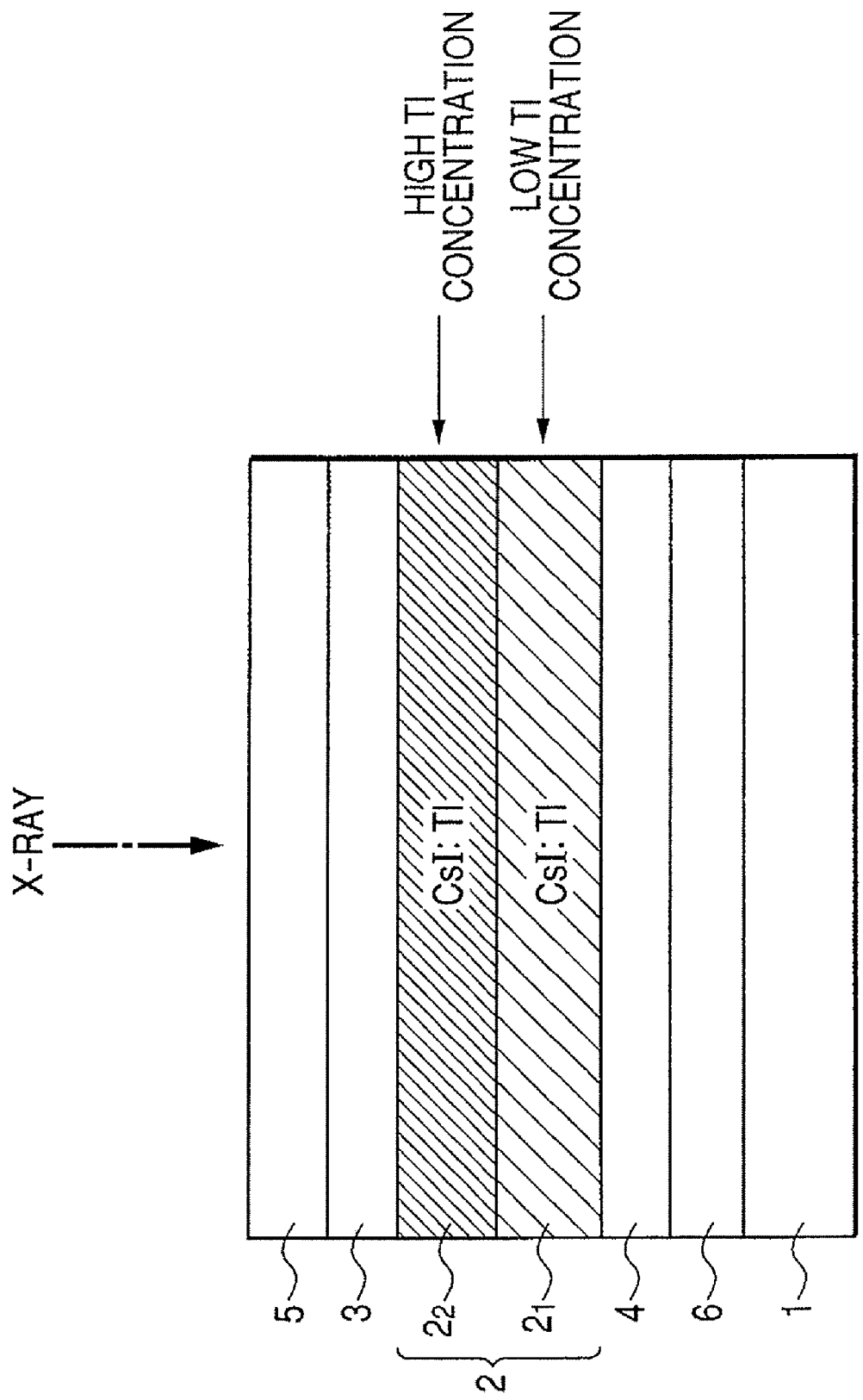
FIG. 4 is a schematic sectional view of the radiation detection apparatus according to a second embodiment of the present invention.

FIG. 4 is a schematic sectional view of the radiation detection apparatus in the second embodiment.

The present embodiment is an example on an indirect type, in which a scintillator layer 2 is evaporated on a substrate 5, and after that, it is adhered to a sensor substrate 1 through an adhesive layer 6. An embodiment which forms the scintillator layer 2 on the substrate 5 can be taken as a scintillator panel.

The substrate 5 made of amorphous carbon ("a-C") and the like is formed with a reflecting layer 3 of metal (such as Al, stainless, titanium oxide, and copper alloy), a scintillator layer 2 made of CsI and the like, and a protective layer 4 made of polyparaxylene, hotmelt and the like. These layers are adhered to a sensor substrate 1 having the same configuration as in the first embodiment through an adhesive layer 6 made of a binding adhesive (such as epoxy resin), a adhesive, a hot melt adhesive, and the like. Radiation is incident from the upper part of the substrate 5, is absorbed into a scintillator layer 2, and is converted into visible light. For the scintillator layer 2, thallium (Tl) is used as an activator, and its concentration is distributed.

The scintillator layer 2 is made of two layers. Scintillator layer $2_1$ is a layer mainly determining the MTF, and scintillator layer $2_2$ is a layer mainly determining the light-emission quantity. As an activator, thallium (Tl) is used, and each of the concentrations is different. The concentration of the activator of the scintillator layer 2 gradually decreases from the radiation-incident side to the optical-emission side. In each of scintillator layers $2_2$ and $2_1$, though the concentration of the activator remains constant, it has the relationship concentration in scintillator layer $2_2$>concentration in scintillator layer $2_1$.

Figure 5:
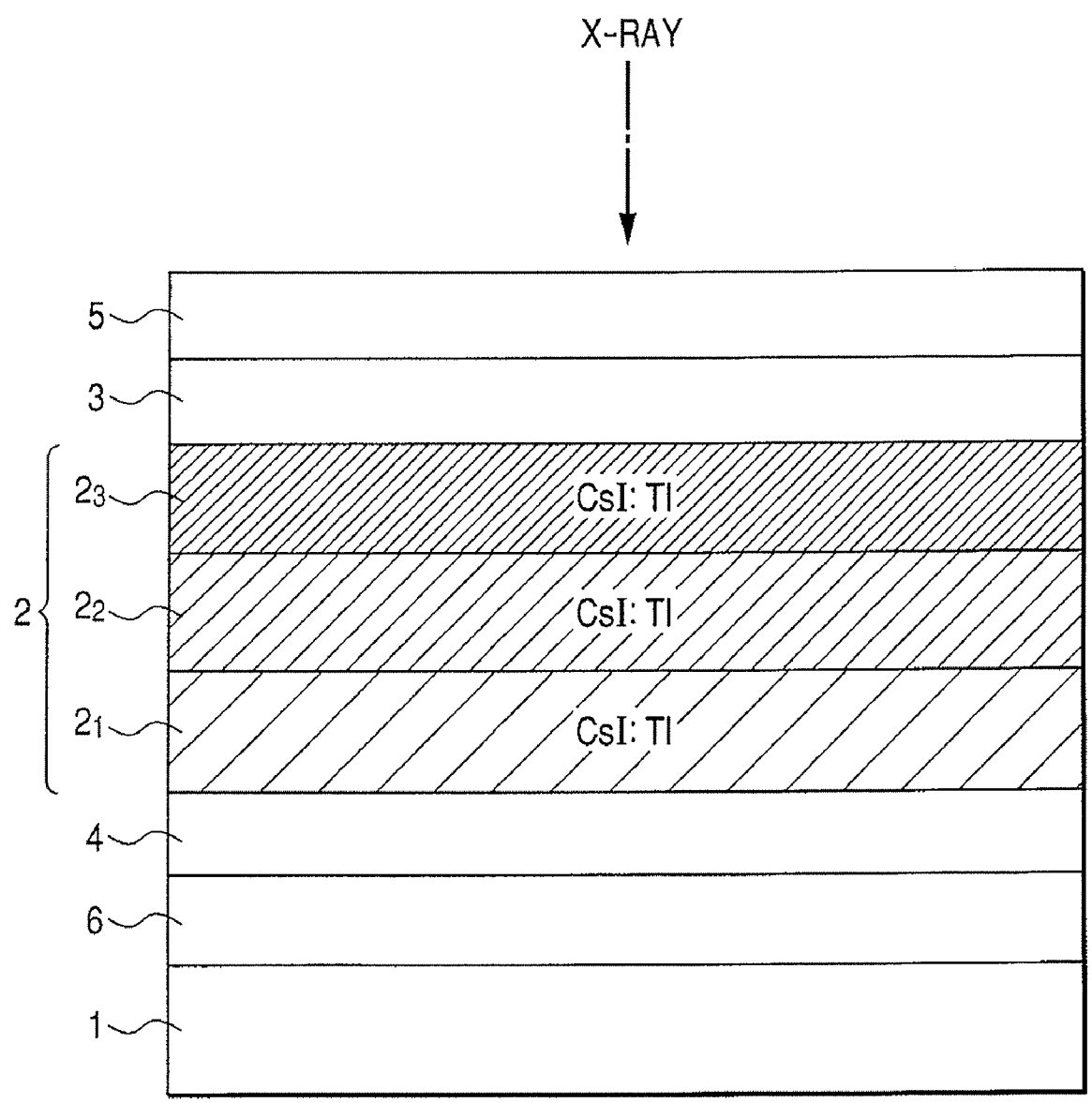
FIG. 5 is a schematic sectional view of another example of the radiation detection apparatus.

FIG. 5 is a schematic sectional view of another example of the radiation detection apparatus in the second embodiment.

The scintillator layer 2 may include a multi-layer structure of three layers or more, and for example, in the case of the three-layer configuration as illustrated in FIG. 5, the concentration of the activator has the relationship concentration in scintillator layer $2_3$>concentration in scintillator layer $2_2$>concentrationi in scintillator layer $2_1$.

Next, a method for producing the scintillator layer of the radiation detection apparatus illustrated in the second embodiment of the present invention will be described. The method for producing the radiation detection apparatus of the present embodiment uses the vacuum vapor deposition apparatus as illustrated in FIG. 3 similarly to the first embodiment.

The substrate 5 is set in a substrate holder 21 with a CsI vapor deposition surface as seen looking downward. The inside of the vacuum chamber 20 of the vapor deposition apparatus is evacuated, and after that, vapor deposition is performed, while rotating the substrate about an axis of rotation 22 that passes through the center of the substrate 5.

In the present embodiment, the Tl concentration of the scintillator layer $2_2$ at the start of vapor deposition is the densest, and the power applied to the TlI boat is adjusted so that the Tl concentration of the scintillator layer $2_1$ becomes thinner. That is, where the Tl concentration is to be increased, the power applied to the TlI boat is increased, and where the concentration is to be decreased, the power is decreased, so that the Tl concentration in the CsI film can be controlled.

The method for producing other scintillators is the same as that of the first embodiment.

As the material of a scintillator other than CsI, NaI and the like are also included. Further, as the activator, sodium (Na) and the like can also be used. Next, the effect of the present invention common to the first and second embodiments as compared with the prior art will be described.

Figure 6:
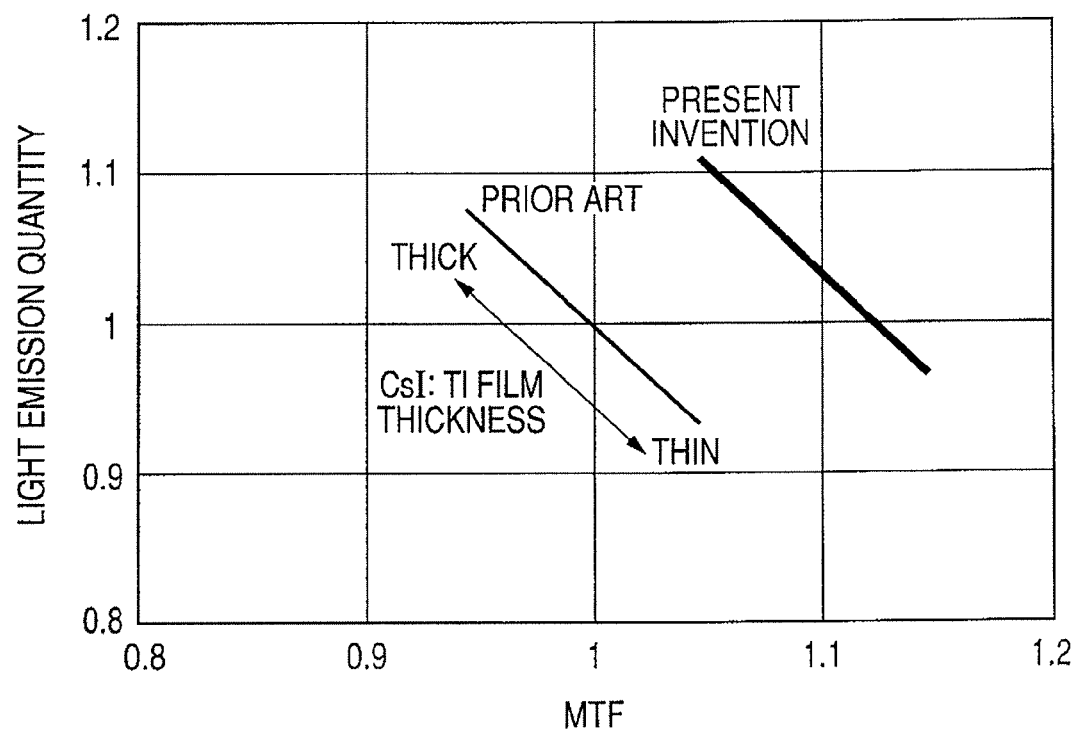
FIG. 6 is a view for describing a relationship between a light emission quantity and an MTF in the prior art and the present invention.

FIG. 6 is a view for describing a relationship between the light-emission quantity and the MTF in the prior art and the present invention.

The prior art shows a relationship between the light-emission quantity and the MTF when the film thickness of the CsI:Tl, in which the Tl concentration is constant for the entire layers is changed. The light-emission quantity of a sample of the central value of the changed film thickness and the MTF are taken as a reference. As illustrated in FIG. 6, there is a trade-off relationship in that the film thickness is made greater when the light-emission quantity is to be decreased, and the film thickness is made smaller when the MTF is to be increased. The present invention, for comparison with the prior art, is represented by a sample in which the Tl concentration at the sensor side is made small; it is found that both the light-emission quantity and the MTF are improved.

Third Embodiment

Figure 7:
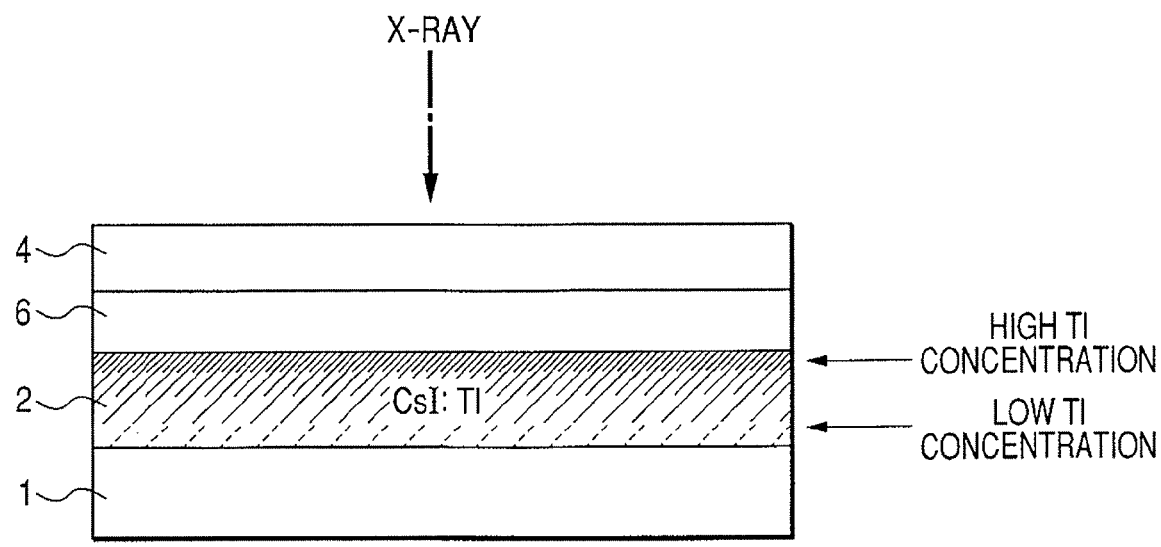
FIG. 7 is a schematic sectional view of the radiation detection apparatus according to a third embodiment of the present invention.

FIG. 7 is a schematic sectional view of a radiation detection apparatus in a third embodiment.

The present embodiment is an example of a direct type in which a scintillator layer 2 on a sensor substrate 1 is directly evaporated. A sensor substrate 1, an adhesive layer 6, and a protective layer 4 are the same as those of the first embodiment.

In the present embodiment, for the scintillator layer 2, thallium (Tl) is used as an activator, and its concentration is distributed so as to be gradually changed. That is, the concentration of the activator is given a distribution such that the concentration is gradually lowered from the radiation-incident side to the optical detector side.

Next, a method for producing the scintillator layer of the radiation detection apparatus illustrated in the present embodiment will be described.

The method for producing the radiation detection apparatus of the present embodiment uses the vacuum vapor deposition apparatus illustrated in FIG. 3 similarly to the first embodiment.

The vapor deposition of a scintillator layer (CsI:Tl) is performed by a vapor co-deposition of a main ingredient (CsI) and a doping material (TlI). A sensor substrate 1 is set to a substrate holder 21 with the light-receiving surface facing downward. The inside of the vacuum chamber 20 of the vapor deposition apparatus is evacuated, and after that, vapor deposition is performed, while rotating the substrate by an axis of rotation 22 that passes through the center of the sensor substrate 1.

The CsI and TlI which are raw materials are put into a separate boat, respectively, and are preheated up to a predetermined temperature by a vapor deposition heating source 23 until the vapor deposition starts. During preheating, an unillustrated shutter or the like is used so that the vapor deposition materials do not reach the substrate. At the same time as the vapor deposition starts, the shutter is opened. The power applied to the CsI boat 24 during the vapor deposition is held constant, and the power applied to the TlI boat 25 is changed, thereby controlling the Tl concentration. That is, when the Tl concentration is to be increased, the power applied to the TlI boat is increased, and when the concentration is to be made smaller, the power is decreased, so that the Tl concentration in the CsI film can be controlled. Up to here, the method for production is the same as that of the first embodiment.

In the present embodiment, the Tl concentration at the start of vapor deposition is the lowest, and the power applied to the TlI boat is gradually increased so that the Tl concentration becomes uniformly dense.

Further, the method for measuring the concentration of the activator is the same as the first embodiment.

As a scintillator other than CsI, NaI and the like are also included. Further, as the activator, sodium (Na) and the like can also be used.

Fourth Embodiment

Figure 8:
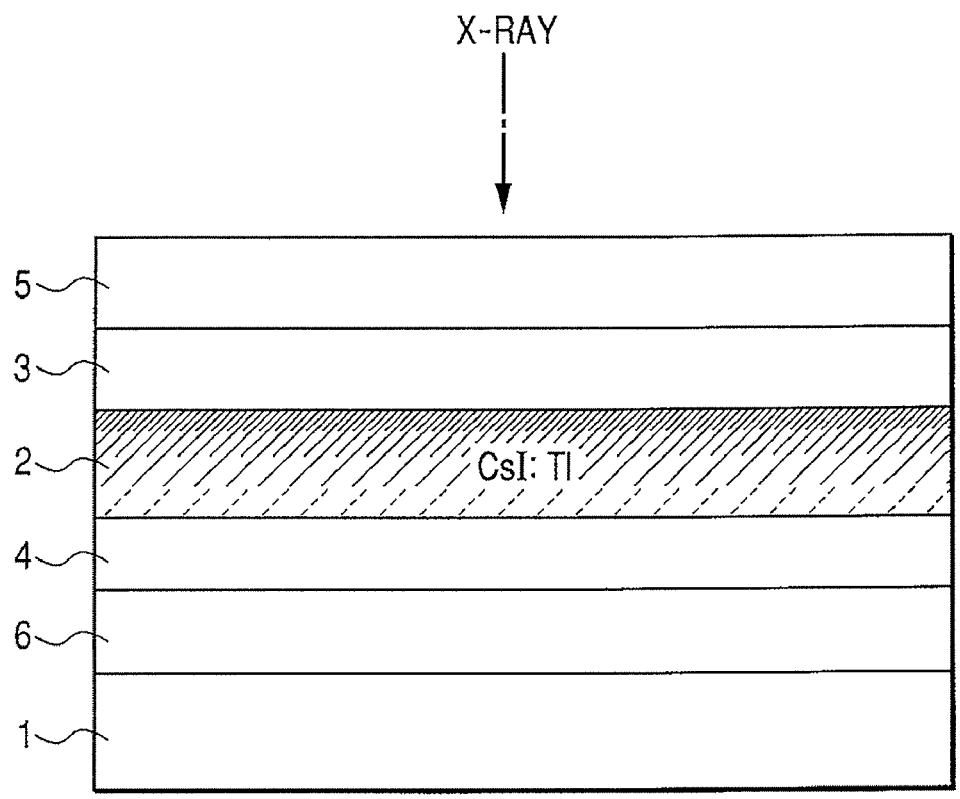
FIG. 8 is a schematic sectional view of the radiation detection apparatus according to a fourth embodiment of the present invention.

FIG. 8 is a schematic sectional view of a radiation detection apparatus in a fourth embodiment.

The present embodiment is another example of an indirect type, in which a scintillator layer 2 is evaporated on a substrate 5, and after that, it is adhered to a sensor substrate 1 by means of an adhesive layer 6. A sensor substrate 1, an adhesive layer 6, a protective layer 4, a reflecting layer 3, and a substrate 5 are the same as those in the second embodiment. An embodiment which forms the scintillator layer 2 on the substrate 5 can be taken as a scintillator panel.

In the present embodiment, for the scintillator layer 2, thallium (Tl) is used as an activator, and its concentration is distributed so as to be gradually changed. The concentration of the activator is given a distribution such that the concentration is gradually made lower from the radiation-incident side to the optical emission side.

A method for producing the radiation detection apparatus of the present embodiment uses the vacuum vapor deposition apparatus as illustrated in FIG. 3 similarly to the first embodiment.

The vapor deposition of a scintillator layer (CsI:Tl) is performed by a vapor co-deposition of a main material (CsI) and a doping material (TlI). The substrate 5 is set in a substrate holder 21 with its light-receiving surface facing downward. The inside of the vacuum chamber 20 of the vapor deposition apparatus is evacuated, and after that, vapor deposition is performed, while rotating the substrate about an axis of rotation 22 that passes through the center of the substrate 5.

In the present embodiment, the Ti concentration at the start of vapor deposition is the densest, and the power applied to a TlI boat is gradually decreased so that the Ti concentration becomes uniformly thinner.

A method for producing other scintillator layers of the radiation detection apparatus is the same as that of the third embodiment, and the method for measuring the concentration of the activator is the same as that of the first embodiment.

The material of the scintillator layer is formed by vapor deposition on the sensor panel, and particularly, since it can obtain a high sharpness, a columnar crystal having a columnar crystal structure is suitable. In this case, the scintillator layer is made of an aggregate in which the columnar crystals are gathered. Specifically, alkaline halide: activator having a columnar crystal structure is suitably used, and in addition to the CsI:Tl, CsI:Na, NaI:Tl, LiI:Eu, KI:Tl, and the like can be used.

Figure 9:
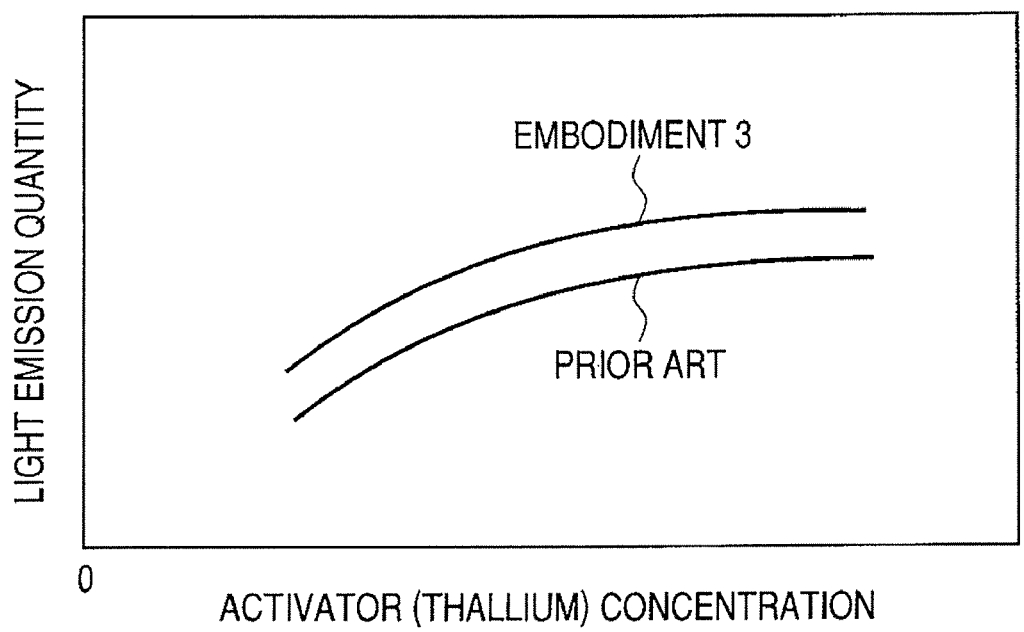
FIG. 9 is a view for describing a relationship between a light emission quantity and the concentration of an activator in the prior art and the present invention.

FIG. 9 is a view for describing the relationship between the light emission quantity and the concentration of the activator in the prior art and the present invention.

The effect of the present invention in the third embodiment will be shown. The prior art has the Tl concentration in a thickness direction constant. The TI concentration in the axis of abscissas of the third embodiment is a concentration in which the concentrations of the upper part, the middle part, and the lower part are measured, respectively by the method for measuring the Ti concentration disclosed in the present specification and the resultant concentration is arithmetically averaged out.

As described above, the third and fourth embodiments illustrate examples of the scintillator layer in which the concentration of the activator is gradually decreased from the incident side of the radiation to the optical detector side (optical emission side). Further, the scintillator layer may be formed by a layer in which the concentration of the average value per constant thickness in the activator is decreased from the incident side of the radiation to the optical detector side. In addition to the case where the concentration is uniformly decreased, the case where the concentration is decreased accompanied with fluctuation is also included.

Fifth Embodiment

In the present embodiment, a still another configuration in which a light emission quantity and an MTF characteristic can be improved will be described. While the description will be made for the case where radiation incident on a scintillator is x-rays, an α-ray, β-ray, or γ-rays can also obtain the same effect.

Figure 10:
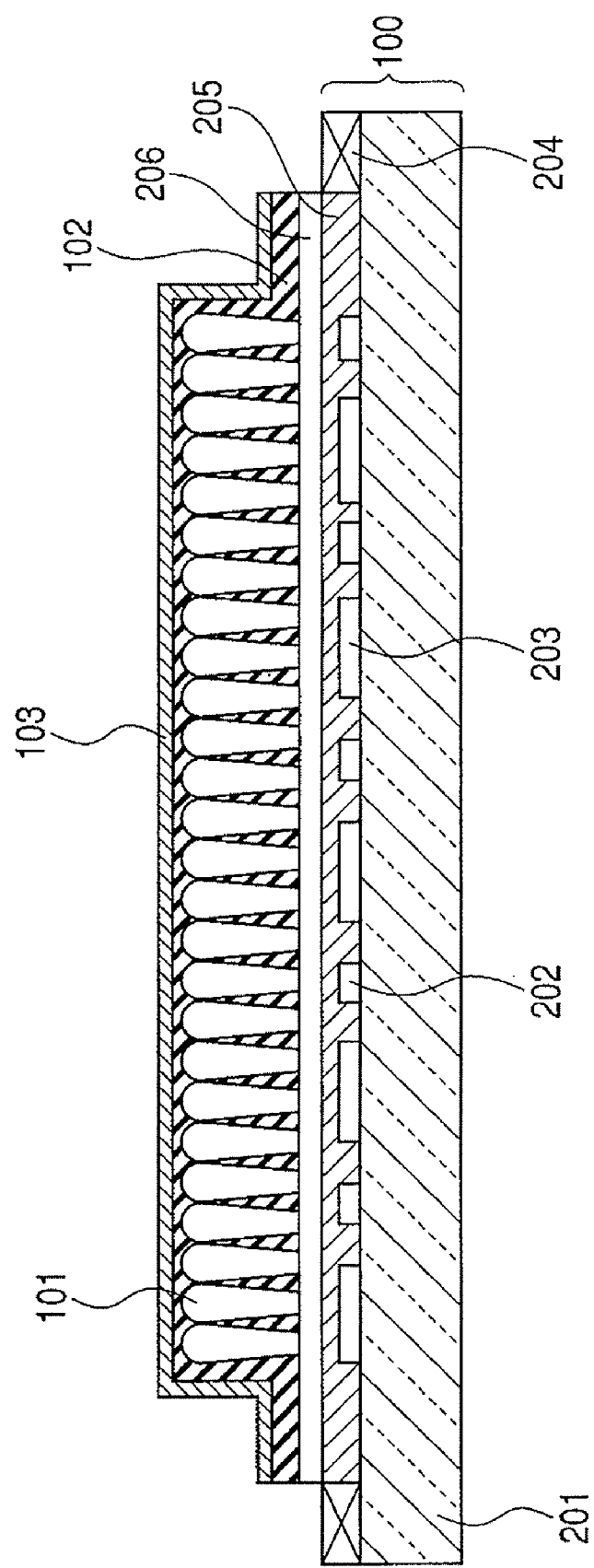
FIG. 10 is a sectional view illustrating the radiation detection apparatus according to a fifth embodiment of the present invention.

FIG. 10 is a sectional view illustrating a radiation detection apparatus according to a fifth embodiment of the present invention.

As illustrated in FIG. 10, on a glass substrate 201 which is an insulating substrate, a photoelectric conversion element portion 203 two-dimensionally formed with pixels including a photosensor using amorphous silicon and a TFT is formed. Further, on the glass substrate 201, a wiring portion 202 connected to the photoelectric conversion element portion 203 and an electrode takeout portion (electrode pad portion) 204 connected to the wiring portion 202 are formed. Further, the photoelectric conversion element portion 203 and the wiring portion 202 are covered by a protective layer (first protective layer) 205 made of silicon nitride and the like. By such configuration, a sensor panel (referred to also as a "two-dimensional optical detector", a "photoelectric conversion panel" and the like) 100 is formed. On the protective layer 205, a second protective layer 206 including an organic resin layer may be further provided according to needs.

On the first protective layer 205 (or the second protective layer 206), a scintillator layer 101 is formed. The scintillator layer 101 can be directly formed on the sensor panel 100 by a technique such as a vapor deposition. Further, the surface of the protective layer 205 or protective layer 206 on which the scintillator layer 101 is formed is preferably subjected to a so-called surface treatment in order to improve an adhesion with the scintillator layer 101. The surface treatment method can use a generally known treatment method, and a surface modification such as a corona treatment, plasma treatment, and UV irradiation treatment can be cited.

Figure 11:
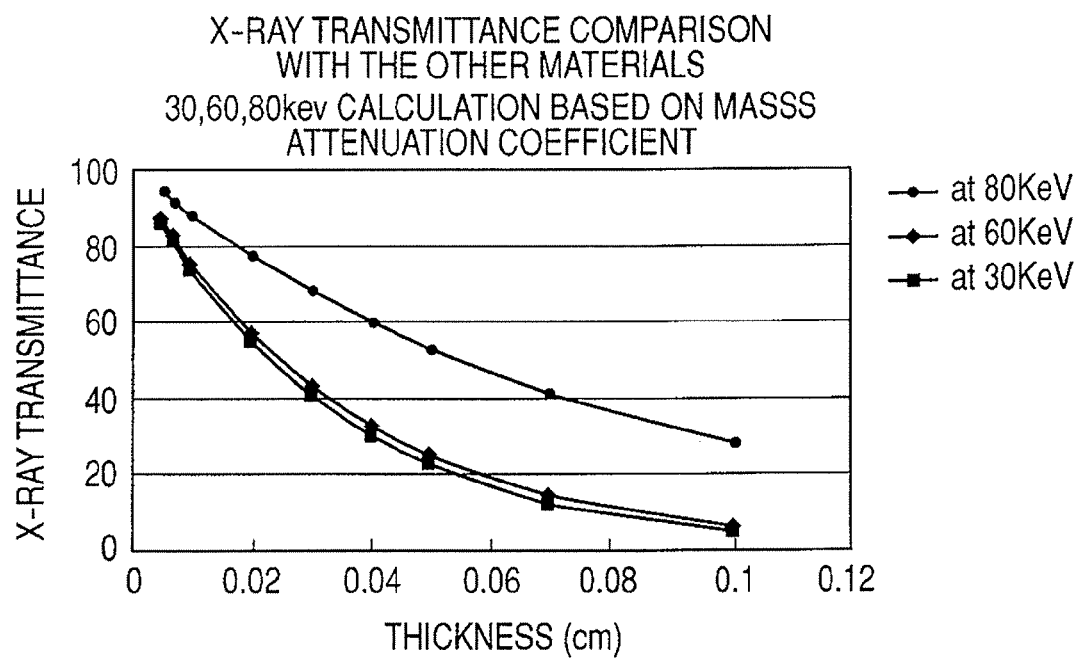
FIG. 11 is a characteristic view illustrating a relationship between a thickness and an x-ray transmittance.

FIG. 11 is a characteristic view illustrating a relationship between a thickness and an x-ray transmittance.

The x-rays are absorbed into a scintillator (CsI; cesium iodide) from an x-ray incident side, and advances, and as illustrated in the characteristic view with a thickness and an x-ray transmittance of FIG. 11, depends on an irradiation energy, but it is attenuated by 30 to 50% until reaching a depth of approximately 250 μm. Hence, a depth of up to approximately 250 μm from the x-ray incident side of the scintillator layer contributes greatly to the light emission. In the present embodiment, a sectional area in the surface direction of a columnar crystal at the x-ray incident side which absorbs more x-rays is formed larger than the sectional area of the columnar crystal of a vapor deposition starting surface side. As a result, a layer high in emission function can be formed, so that a scintillator having a high light-emission characteristic can be obtained.

The depth of the region in which a sectional area of the columnar crystal absorbing the x-rays at the x-ray incident side is large is decided by a relationship with the sensitivity of the photoelectric conversion element of the sensor panel, and therefore, if the sensitivity of the photoelectric conversion element is high, the depth may be small. The depth of the region in which the sectional area of the columnar crystal is large is preferably not less than 100 μm, and is more preferably not less than 250 μm when considering the contribution to light emission.

As described above, since the x-rays advance while being absorbed from the x-ray incident side of the scintillator, in the region close to the sensor panel, a high light-emission quantity cannot be expected, as the x-rays are attenuated from the very start. Consequently, if the region close to the sensor panel in the scintillator layer is rather specialized for the characteristic allowing a light emission from the region close to the x-ray incident side to propagate to the sensor panel, the ultimate takeout efficiency of the sensor panel can be improved. The columnar crystal forms a layer with columns abutting each other, and the larger the contact area of the column boundary surface is, the more easily the light from a contact boundary surface leaks and propagates, and therefore, the takeout light quantity tends to attenuate, and the sharpness tends to deteriorate. Hence, the region of the scintillator layer close to the sensor panel should be made smaller so that the contact area of the boundary surface between columnar crystals is small. From the above described reason, the sectional area of the columnar crystal of the scintillator at the sensor panel side is formed smaller than the x-ray incident side.

Figure 12:
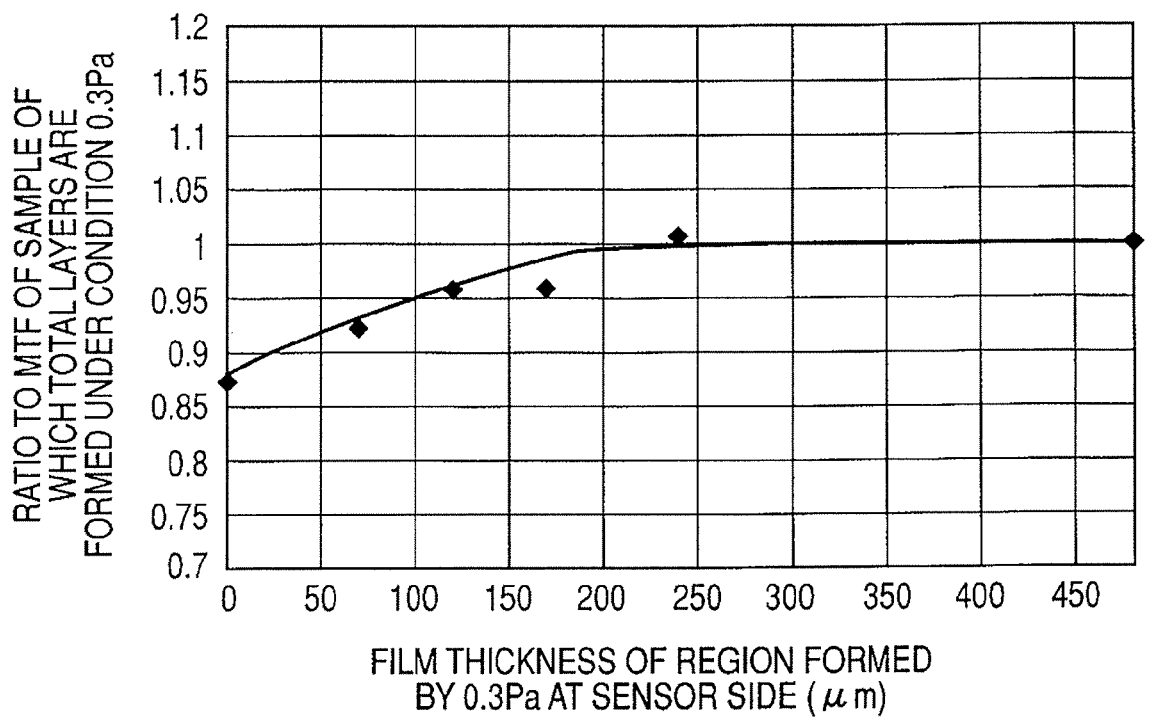
FIG. 12 is a characteristic view illustrating a relationship between a film thickness and an MTF.

FIG. 12 is a characteristic view illustrating a relationship between a film thickness and the MTF.

According to experiments of the present inventor and others, as shown in FIG. 12, with respect to the region small in a sectional area of the columnar crystal, it was found that when a distance (film thickness) from the sensor panel side increases, an MTF (Modulation Transfer Function) also improves. When the distance (film thickness) from the sensor panel side is in the vicinity of 100 μm, and the columnar crystals are all formed in the region small in the sectional area, the ratio of the MTF to the columnar crystal exceeds 0.95. In the vicinity of 200 μm, it was found that when the columnar crystals are all formed in the region small in the sectional area, the ratio of the MTF to the columnar crystal reaches approximately 1. The experiment in which the columnar crystal (CsI) of the scintillator layer is formed by vapor deposition was performed by introducing Ar into a container and adjusting the pressure inside the container in order to change the pressure inside the container and control the sectional area of the columnar crystal. In the present experiment, though Ar was used, an inactive gas such as He or Ne, and a mixed gas (a mixture of inactive gases) can be used. As a result of the experiment, in a low pressure region (not less than 0.01 Pa and not more than 0.25 Pa), the sectional area of the columnar crystal grew larger than a high pressure region (not less than 0.25 Pa and not more than 2.0 Pa). The thickness of the scintillator layer was taken as 480 μm and the region small in the sectional area of the columnar crystal was changed (0 to 480 μm), thereby performing the experiment.

Consequently, the thickness of the region large in the sectional area of the scintillator layer, when considering a light-emission quantity, depends on the irradiation energy, but it is preferably not less than 50 μm (minimum value of FIG. 11). Further, it is preferably not less than 100 μm from the incident side of the x-rays attenuated by 10 to 30%, and more preferably not less than 250 μm from the incident side of the x-rays attenuated by 30 to 50%. Although the thickness of the region small in the sectional area of the scintillator layer creates an effect of improving the MTF if provided not less than 50 μm when considering the MTF, the ratio of the MTF is preferably not less than 100 μm exceeding 0.95, and more preferably, the ratio of the MTF is not less than 200 μm, which is approximately 1.

The thickness of the scintillator layer may be 250 to 650 μm, and is preferably 300 to 450 μm.

In the present embodiment, as a technique for forming the sectional area of the columnar crystal at the x-ray incident side large and forming the sectional area of the columnar crystal at the sensor panel side small, the following is available.

1) In the first half of the vapor deposition, temperature and pressure are maintained constant, and in the last half of the vapor deposition, the inside of the substrate and/or a tank is heated, and the temperature inside the tank is raised, and the vapor deposition is performed, while maintaining the pressure constant.

2) The evaporation pressure of the scintillator at the sensor panel side is allowed to be larger than the evaporation pressure of the scintillator at the x-ray incident side.

3) The evaporation pressure of the scintillator at the sensor panel side is allowed to be larger than the evaporation pressure of the scintillator of the middle part layer, and the evaporation pressure of the scintillator of the middle part layer is allowed to be larger than the evaporation pressure of the scintillator at the x-ray incident side.

That is, a combination of the temperature control and the evaporation pressure control is conceivable. The scintillator has a columnar diameter made thicker by the temperature raised higher during the vapor deposition. Further, when the evaporation pressure is low, a filling density inside the crystal becomes high, and a high emission layer can be obtained by a crystal having a thick columnar diameter.

In the present embodiment, a preparing condition of the scintillator layer may gradually change toward the light take-out surface side from the x-ray incident surface side, and the condition may be intermittently changed.

Figure 13A:
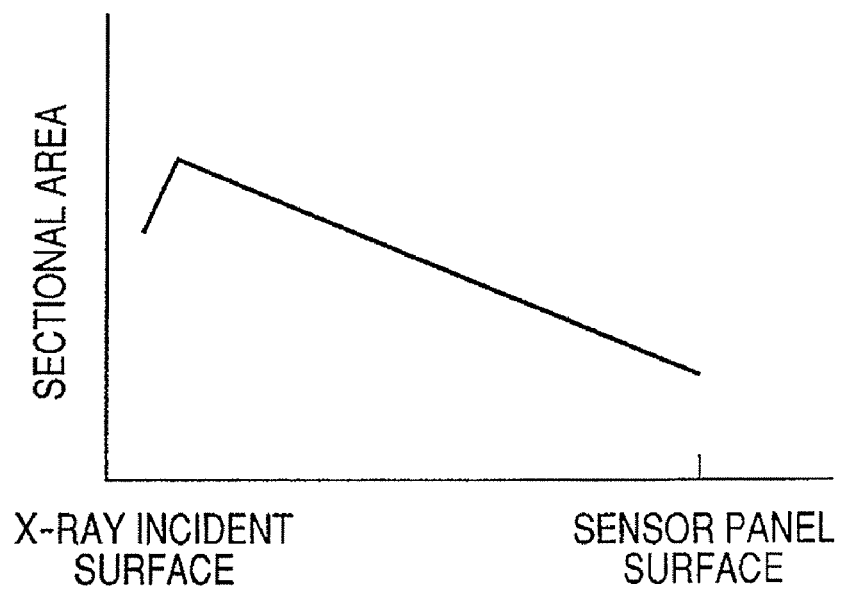
FIG. 13A is a view illustrating a relationship between a length and a sectional area of a columnar crystal, and is an example in which the sectional area of the columnar crystal is formed so as to be reduced at a constant reduction rate when seen from an x-ray incident plane.
Figure 13B:
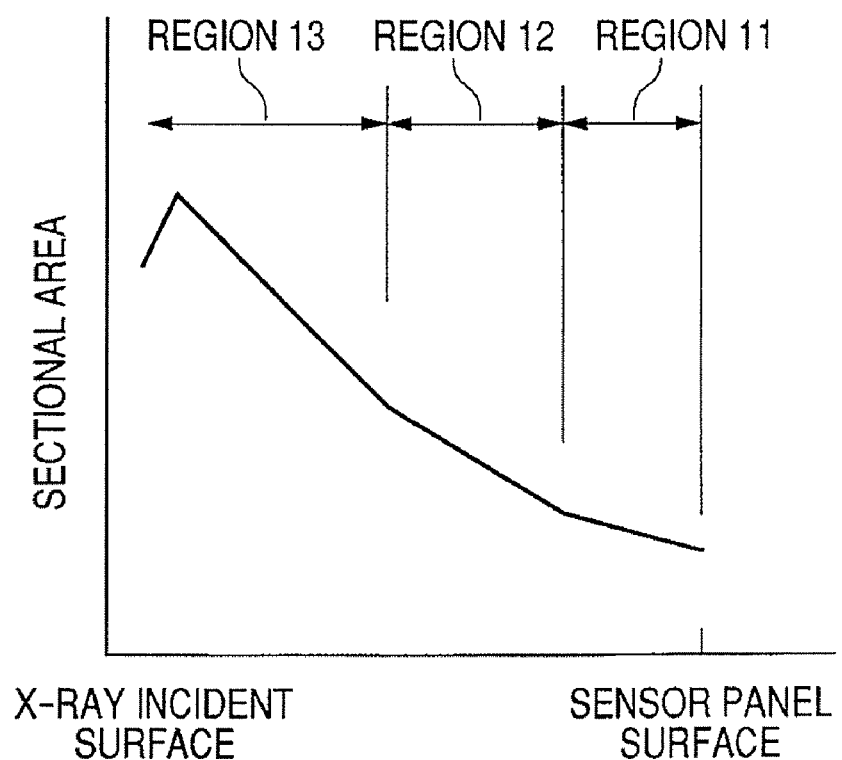
FIG. 13B is a view illustrating a relationship between a length and a sectional area of a columnar crystal, and is an example in which a reduction rate of the sectional area of the columnar crystal is different in three regions.

FIGS. 13A and 13B are views illustrating a relationship between the depth and the sectional area of a columnar crystal.

FIG. 13A illustrates an example in which the sectional area of the columnar crystal is formed in such a manner as to be reduced at a constant reduction rate when viewed from the x-ray incident surface. FIG. 13B illustrates an example in which the reduction rate of the sectional area changes in the boundary in a layer direction of the scintillator layer, that is, an example in which the reduction rate of the sectional area of the columnar crystal is different in three regions. The radiation detection apparatus illustrated in FIG. 10 uses the columnar crystal in the shape similarly to FIG. 13A.

Incidentally, the reduction rate of the sectional area may be allowed to change not in the three regions, but in two regions as illustrated in FIG. 13B. Needless to mention, the reduction rate of the sectional area may be allowed to vary in four or more regions. The head of the columnar crystal has a sharpened shape or the like, and is often not flat, and the sectional area is reduced in the vicinity of the x-ray incident surface as illustrated in FIGS. 13A and 13B. Further, when grown from the sensor panel, in proportion as the sectional area of the columnar crystal becomes larger, a rate of increase of the sectional area is reduced by contacting the adjacent columnar crystal, and alternatively, there are often the cases where the sectional area grows while remaining approximately constant. Further, even when not contacting the adjacent columnar crystal, a region in which the sectional area is approximately constant may be provided. For example, in FIG. 13B, the sectional areas of regions 11 and 13 may remain constant. Further, the sectional area of each columnar crystal may be increased in part of the process of decreasing from the radiation incident side to the optical emission side.

In the configuration of three regions as illustrated in FIG. 13B, a region 13 is a region in which a ratio of contribution to the light emission is high, and a region 11 mainly functions to improve sharpness. A region 12 is an intermediate layer, and is lower in a ratio of contribution to the light emission than the region 13, but functions as a region also to improve the sharpness. The region 11 may be small in thickness since the region 12 is provided, and its thickness, for example, can be made approximately 5 to 15 μm.

Such region 11 can be formed in the pressure range of a high pressure region in the initial period of forming the columnar crystal. Further, in the growing process of the columnar crystal, there are often the cases where a layer having no crystal structure is formed on the sensor panel before the growth of the columnar crystal (configuration in which a thin layer is formed on the sensor panel). However, even when such a layer is formed in the initial period of the formation, if it is formed not more than 25 μm, it is also confirmed that the MTF is not adversary affected.

Figure 14:
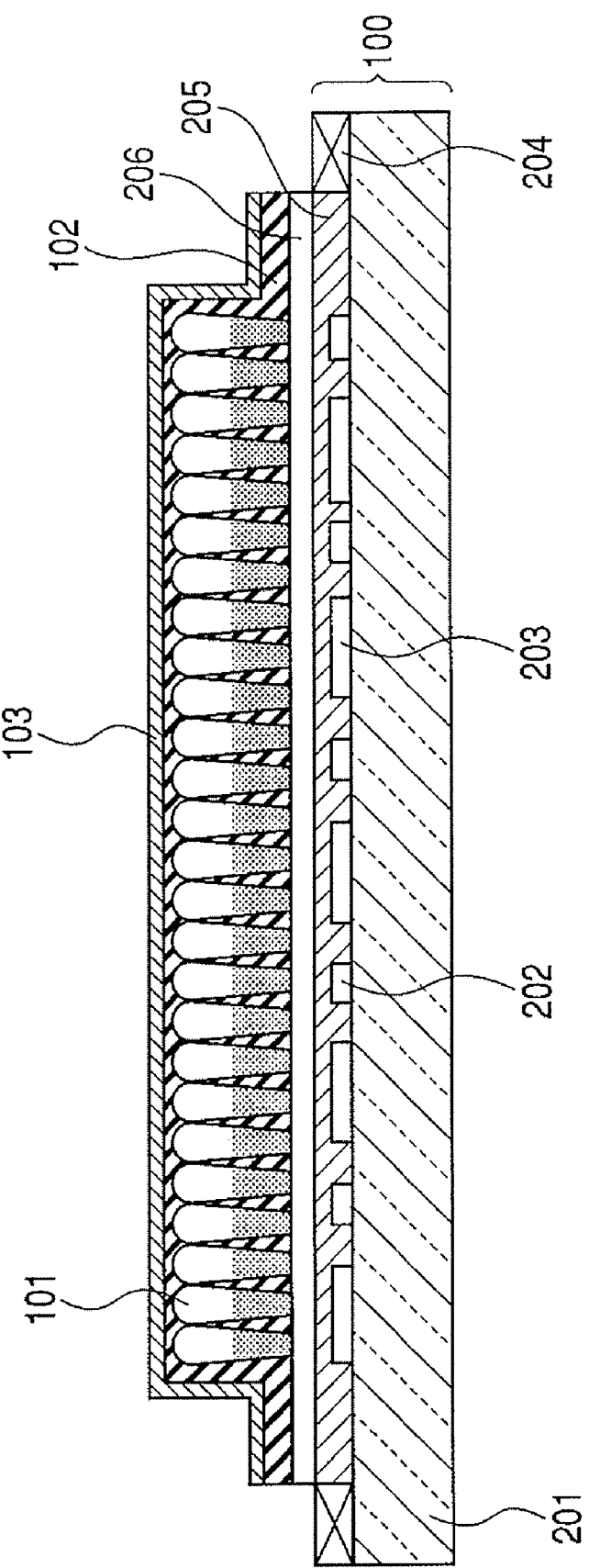
FIG. 14 is a view where a scintillator layer is formed by an aggregate of the columnar crystal illustrated in FIG. 13B.

FIG. 14 illustrates a case where the scintillator layer is made of an aggregation of the columnar crystals illustrated in FIG. 13B. The same reference numerals will be attached to the same component parts as FIG. 10, and the description thereof will be omitted.

A method for producing the scintillator layer of the radiation detection apparatus in the present embodiment will be executed by using the production method of FIG. 3.

That is, the CsI and TlI which are the raw materials are put into a separate boat, respectively, and are pre-heated up to a predetermined temperature by an vapor deposition heating source 23 until a vapor deposition starts. During the pre-heating, an unillustrated shutter and the like are used so that the vapor deposition material does not reach the substrate. At the same time as the vapor deposition starts, the shutter is opened, and a power is controlled so that the vapor deposition speed of a CsI boat 24 becomes constant during the vapor deposition, and the power is changed so as to change the vapor deposition speed of a TlI boat 25, thereby controlling the Tl concentration. That is, when the Tl concentration is increased, the power applied to the TlI boat is increased, and when the concentration is decreased, the power is decrease, so that the thallium concentration in the CsI film can be controlled.

When the concentration of an activator in the region close to the x-ray incident side in which the absorption of the x-ray contributes to the light emission in large measure is increased, a light emission quantity can be made large. In the present invention, since the sectional area of the columnar crystal of the sensor panel side is made small, the light emission quantity can be improved with the sharpness maintained as it is.

TABLE 1

|  |  |  | Embodiment 1 Temperature change/pressure constant | Embodiment 2 Pressure changed (two layers) | Embodiment 3 Pressure changed (three layers) | Embodiment 4 Pressure changed (two layers) | Embodiment 5 Pressure changed (three layers) | Comparison sample 1 Average columnar diameter constant | Comparison sample 2 Power constant Pressure constant |
|---|---|---|---|---|---|---|---|---|---|
| Sensor panel side | Thickness | μm | 200 | 200 | 10 | 200 | 10 | 200 | 200 |
|  | Pressure | Pa | 0.4 | 0.4 | 0.9 | 0.4 | 0.9 | 0.4 | 0.4 |
|  | Temperature inside tank | °C. | 100 | 180 | 180 | 100 | 100 | 150 | 150 |
|  | Average columnar diameter | μm | 2 | 3 | 2 | 2 | 1.5 | 3 | 3 |
| Middle part | Thickness | μm |  |  | 120 |  | 120 |  |  |
|  | Pressure | Pa |  |  | 0.4 |  | 0.4 |  |  |
|  | Temperature inside tank | °C. |  |  | 170 |  | 150 |  |  |
|  | Average columnar diameter | μm |  |  | 4 |  | 4 |  |  |
| x ray incident side | Thickness | μm | 200 | 200 | 270 | 200 | 270 | 200 | 200 |
|  | Pressure | Pa | 0.4 | 0.4 | 0.2 | 0.2 | 0.2 | 0.5 | 0.4 |
|  | Temperature inside tank | °C. | 150 | 180 | 150 | 180 | 180 | 50 | 150 |
|  | Average columnar diameter | μm | 5 | 6 | 6 | 6 | 6 | 3 | 4 |
|  | Material |  | CsI:Tl | CsI:Tl | CsI:Tl | CsI:Tl | CsI:Tl | CsI:Tl | CsI:Tl |
|  | Whole layer thickness | μm | 400 | 400 | 400 | 400 | 400 | 400 | 400 |
| Light emission amount |  |  | 1.2 | 1.3 | 1.4 | 1.3 | 1.4 | 1 | 1.1 |
| Sharpness | at 21 p/mm |  | 1.1 | 1.1 | 1.2 | 1.2 | 1.3 | 1 | 1 |

In the above table 1 is shown the characteristic obtained of the radiation detection apparatus. As illustrated in the first to fifth embodiments, the radiation detection apparatus performs a high light emission in the scintillator layer region in which the absorption of the x-rays is highest since the columnar shape of the scintillator at the x-ray incident side is thicker in an average columnar diameter (since the sectional area is large) than the scintillator at the non-x-ray incident side. Further, the light emitted by the x-ray absorption is effectively propagated and reaches the sensor surface due to the fact that a scintillator at the non-x-ray incident side is narrow, and this leads to the improvement of a high takeout efficiency and can obtain the radiation detection apparatus of high performance. Incidentally, the average columnar diameter means converting a section of the columnar crystal into a circle so as to calculate a diameter and then averaging out a long direction of the columnar crystal. The reason why the section of the columnar crystal is converted into a circle is that there are often cases where the section of the columnar crystal has a polygonal shape. Here, while an average columnar diameter R has been shown, the average sectional area can be determined by $\pi(R/2)^2$.

By such configuration, light emission efficiency and resolution can be improved. By applying the present embodiment to the first and third embodiments, the light emission efficiency and resolution can be further improved.

Sixth Embodiment

A scintillator panel and a radiation detection apparatus in which the scintillator panel is adhered to a sensor panel will be described as a sixth embodiment of the present invention.

Figure 15A:
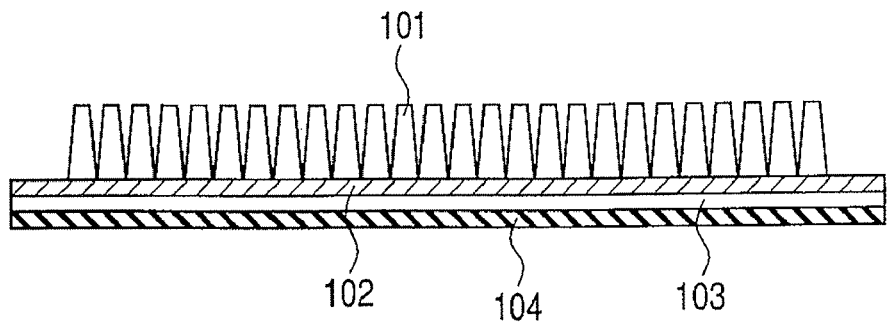
FIG. 15A is a scintillator panel according to a sixth embodiment of the present invention.
Figure 15B:
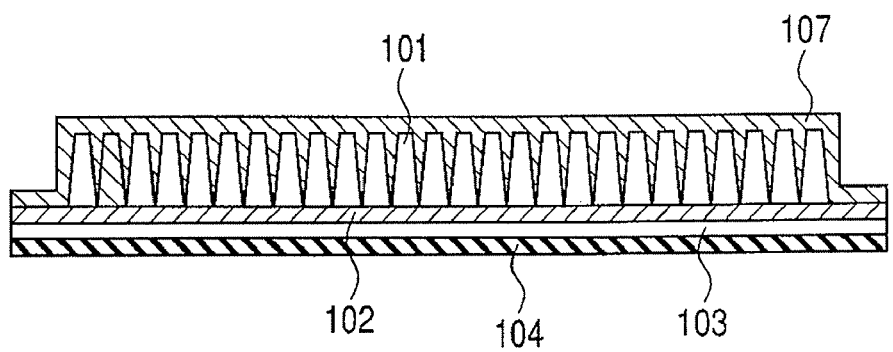
FIG. 15B is a scintillator panel according to a sixth embodiment of the present invention.
Figure 15C:
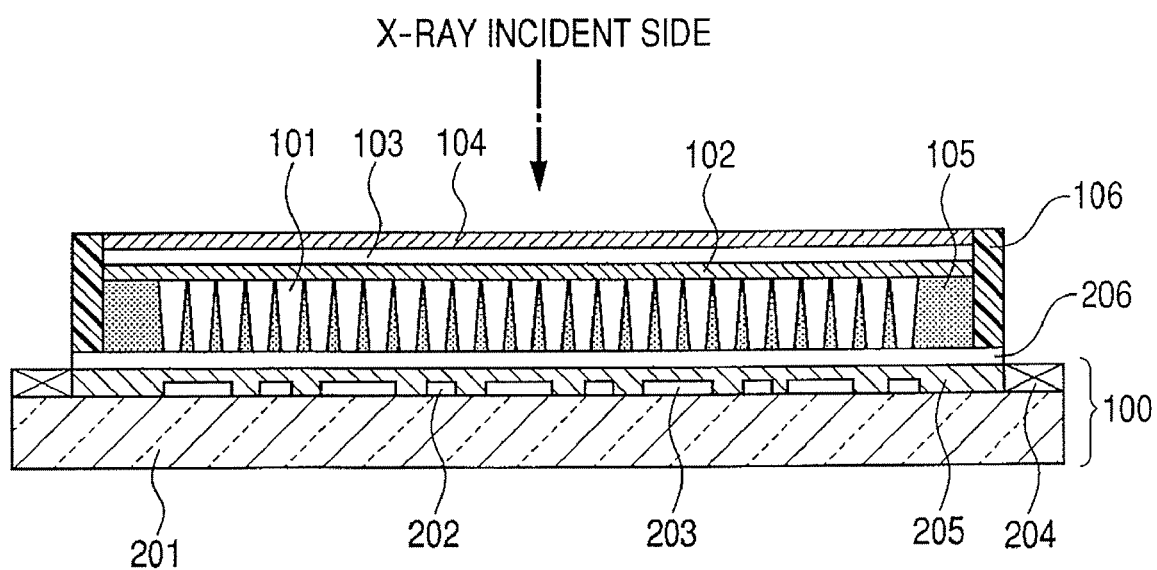
FIG. 15C is the radiation detection apparatus according to the sixth embodiment of the present invention.

FIGS. 15A to 15C are sectional views illustrating the scintillator panel and the radiation detection apparatus in the sixth embodiment of the present invention.

In FIG. 15A illustrating the scintillator panel, on a support substrate 104 such as a carbon plate, a reflecting layer 103 and a protective layer 102 are formed. On the protective layer 102, the scintillator is formed similarly to the first embodiment. However, in the present embodiment, since the substrate side is an x-ray incident side, a columnar crystal, in proportion as it grows, is formed so as to be reduced in sectional area. Further, in FIG. 15B illustrating the scintillator, a humidity resistance protective layer 107 may be further provided for covering. Further, the scintillator layer is evaporated on another substrate different from the support substrate 104, and after that, it is transcribed and adhered to the protective layer side of the support substrate 104 to obtain a similar scintillator panel.

This is adhered to the sensor panel 100 illustrated in FIG. 10 by a binding adhesive.

In FIG. 15C illustrating the radiation detection apparatus, the scintillator panel and the sensor panel 100 are adhered to each other by using a binding adhesive 105, and are sealed by a sealing resin 106. Such configuration can improve a yield ratio of a production process since the sensor panel and scintillator panel can be formed in a separate process so that both panels can be selected and adhered to each other.

By such configuration, the light emission efficiency and the resolution can be improved. By applying the present embodiment to the second and fourth embodiments, the light emission efficiency and the resolution can be further improved.

Seventh Embodiment

In the present embodiment, still further configuration enabling durability of a scintillator layer to be improved will be described.

A CsI which is a columnar crystal scintillator layer is high in solubility (water 0° C. 44 g/100 g, 61° C. 160 g/100 g), and is deliquesced by absorption of the moisture in the air, so that a columnar shape is damaged. The columnar shape of scintillator layer is associated with the sharpness characteristic of a radiation detection apparatus, and when isolation and upright habit of each columnar crystal of the scintillator layer are high, a high sharpness characteristic is obtained.

However, if the columnar shape is damaged by deliquesce, the sharpness characteristic is also deteriorated. On the other hand, a TlI used as a doping material is a material hard to dissolve (solubility, water 20° C. 0.0064 g/100 g, 100° C. 0.120 g/100 g) in the water. In general, a quantity of the activator contained in scintillator layer is approximately 0.1 to 2 mol %, and the activator is not added in such a manner that deliquescence of the scintillator layer disappears.

Consequently, there has been a problem that the conventional scintillator layer has the columnar shape damaged by the absorption of the moisture in the air.

Figure 16:
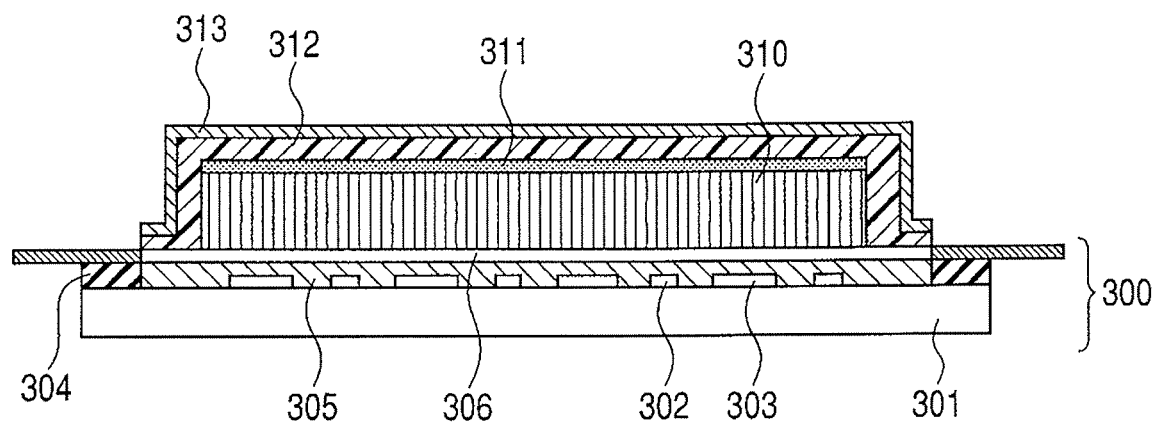
FIG. 16 is a schematic sectional view of the radiation detection apparatus according to a seventh embodiment of the present invention.

FIG. 16 is a schematic sectional view of the radiation detection apparatus in the seventh embodiment.

In the present invention, at the same time as the formation of the scintilator layer (CsI:Tl), a moisture barrier layer comprising a doping material layer 311 is formed on the upper part of a scintilator layer 310, and as a result, deliquescence and absorption of the scintillator layer 310 are prevented.

When the scintillator layer are formed, a main ingredient and doping material are evaporated on a sensor panel 300 at the same time with a desired concentration of a activator. In this case, the main ingredient and doping material may be evaporated at the same time from different vapor deposition sources, and the material mixing the main ingredient and doping material may be evaporated from a monogenetic vapor deposition source.

Next, the scintillator layer is formed on the sensor panel 300, and after that, the doping material only is evaporated so as to form the doping material layer 311. In that case, the vapor deposition source filled with the doping material only apart from the main ingredient vapor deposition source is heated and evaporated.

That is, in the present invention, the scintillator layer, the main ingredient, and the doping material are simultaneously evaporated from different vapor deposition sources, or the material mixed with the main ingredient and the doping material is evaporated from the monogenetic vapor deposition source. When the scintillator layer 310 is formed in a desired thickness, the vapor deposition source is subsequently changed, and the doping material only is evaporated, thereby forming the doping material layer 311.

In this manner, the main ingredient and the doping material are evaporated so as to form the scintillator layer 310, and subsequently, the doping material only is evaporated so as to form the doping material layer 311, thereby forming the scintillator layer 310 and the doping material layer 311 at the same time.

Here, the scintillator layer required for the radiation detection apparatus is 200 to 700 μm, and preferably 400 to 600 μm in thickness. Further, preferably a noticeable hole does not exist in the film in the doping material layer 311 covering the scintillator layer 310, and the thickness is preferably formed not less than 10 nm, and more preferably 50 nm to 1 μm.

In this manner, by forming the doping material layer 311, which forms the scintillator layer and at the same time eliminates deliquescence of the scintillator layer, scintillator layer deterioration until forming the scintillator protective layer after forming the scintillator layer 310 can be dramatically prevented. As the scintillator protective layer, as to be described later, there are a first scintillator protective layer 312, reflecting layer 313, scintillator moisture-proof protective layer (second scintillator protective layer), and scintillator rigid protective layer.

Figure 17:
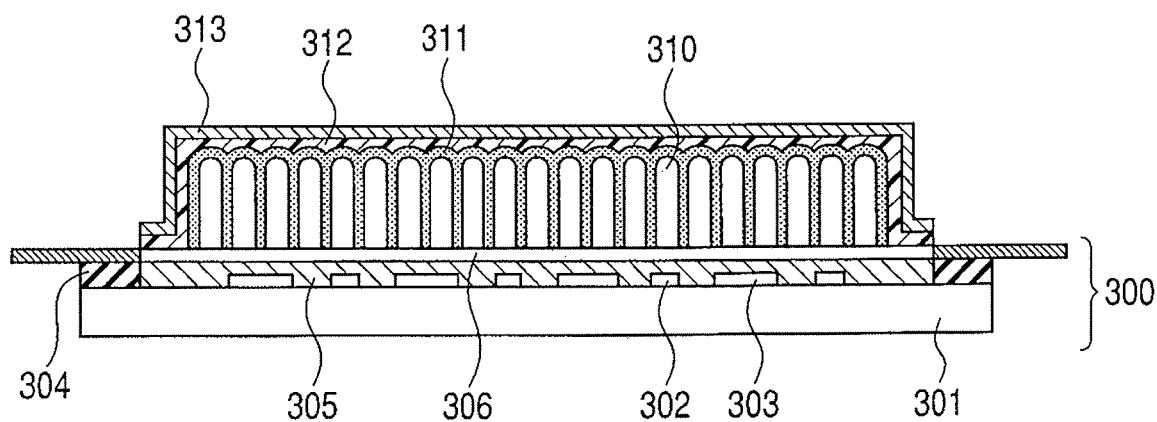
FIG. 17 is a schematic sectional view of another example of the radiation detection apparatus.

FIG. 17 is a schematic sectional view of another example of the radiation detection apparatus in the present embodiment.

As shown in FIG. 17, when the doping material layer 311 is formed so as to cover the entire surface of the phosphor layer in such a manner as to contact the sensor panel 300 formed with the upper surface and the side surface of the scintillator layer 310 or the scintillator layer 310, the durability is further improved, and this is desirable.

Here, in the example of FIG. 17, the columnar crystal scintillator layer 310 is disposed at regular intervals, and the surface (including the intervals between the scintillator layers 310) of the individual scintillator layer 310 is formed with the doping material layer 311. The periphery of the doping material layer 311 is formed with the scintillator protective layer including a plurality of protective layers similarly to FIG. 16. In FIG. 17 also, to produce the scintillator layer and the doping material layer, the same production method as previously described can be used.

At this time, to cover the entire scintillator layer, an vapor deposition pressure is increased (0.1 to 2 Pa) so that the doping material is diffused so as to be evaporated more. When an vapor deposition substrate is rotated and eccentrically rotated or the like for the position of the vapor deposition source, the vapor deposition can be performed so as to effectively cover the entire substrate.

The configuration and preparing method of the present embodiment will be described below.

First, the sensor panel 300 illustrated in FIG. 16 is prepared. Specifically, by using amorphous silicon on an insulative substrate 301, a photoelectric conversion element portion 303 including a photosensor and a TFT and a wiring portion 302 are formed, and on these portions, a first protective layer 305 made of silicon nitride and an electrode takeout portion 304 are formed. After that, on the first protective layer 305, a second protective layer 306 made of polyimide is formed, thereby forming the sensor panel 300.

Next, on a position corresponding to the pixel region of the second protective layer 306 on the sensor panel 300, CsI:Tl (thallium-activated cesium iodide) is evaporated so as to form the scintillator layer 310. The scintillator layer is formed 500 μm in thickness at a pressure 0.1 Pa with the main ingredient CsI at a rate of 5 μm/min and the doping material TlI at a rate of 50 nm/min simultaneously evaporated.

Next, the doping material TlI is evaporated for ten minutes with the same rate, thereby forming the doping material layer 311 of approximately 500 nm in thickness.

Next, a sheet laminated with a hotmelt adhesive of 100 μm in thickness on the Al surface side of an Al/PET sheet laminated with Al 40 μm and PET 50 μm is superposed on the doping material layer 311 such that the hotmelt layer is opposed to the layer. In that state, by pressing the Al/PET sheet under 100° C. at 3 kgf/cm², the sheet is adhered to the sensor panel.

Here, the hotmelt layer corresponds to the scintillator protective layer 312, and the Al from among the Al/PET sheet corresponds to the reflecting layer 313, and the PET corresponds to the second scintillator protective layer (not illustrated) as described above. These protective layers of the scintillator layer are adhered to the sensor panel 300 with a width of 3 mm at the end portion outer periphery.

Further, the electrode takeout portion 304 on the sensor panel 300 is thermally compressed with the terminal portion of a flexible circuit substrate (not illustrated) through an anisotropic conductive adhesive (not illustrated), thereby preparing a radiation detection apparatus.

This radiation detection apparatus is taken as a sample 1. Further, a radiation detection apparatus is prepared, which is different from the sample 1 in that the doping material layer 311 is formed approximately 1 μm in thickness, and is taken as a sample 2. Further, a radiation detection apparatus is prepared, which is different from the sample 1 in that no doping material layer 311 exists, and is taken as a sample 3.

The samples 1, 2, and 3 (comparison sample) are formed with the scintillator layer, respectively, and after that, they are tested under a normal clean room and low humidity clean room. After that, they are adhered with sensor panels and scintillator protective layers and the like, thereby preparing a radiation protection apparatus. The testing time requires thirty minutes for each sample. The test measures the sharpness characteristic of each radiation detection apparatus. The measuring result is shown in Table 2. In Table 2, the preparing conditions of the preparation under the low humidity and the preparation under the normal humidity and the sharpness are shown.

TABLE 2

|  | Preparation under low humidity | Preparation under normal humidity |
|---|---|---|
| Sample 1 | 1 | 1 |
| Sample 2 | 1 | 1 |
| Sample 3 | 0.95 | 0.80 |

As shown in Table 2, samples 1 and 2 produced a good result either in the preparation under the low humidity and the preparation under the normal humidity as compared with sample 3 in sharpness. That is, by providing the doping material layer 311, the columnar shape is not damaged by the moisture absorption during the process, and regardless of the preparing conditions, it was confirmed that a good sharpness can be obtained.

By such a configuration, the durability of the scintillator layer can be improved. By applying the present embodiment to the first to sixth embodiments, the durability of the scintillator layer can be improved.

Eighth Embodiment

Figure 18:
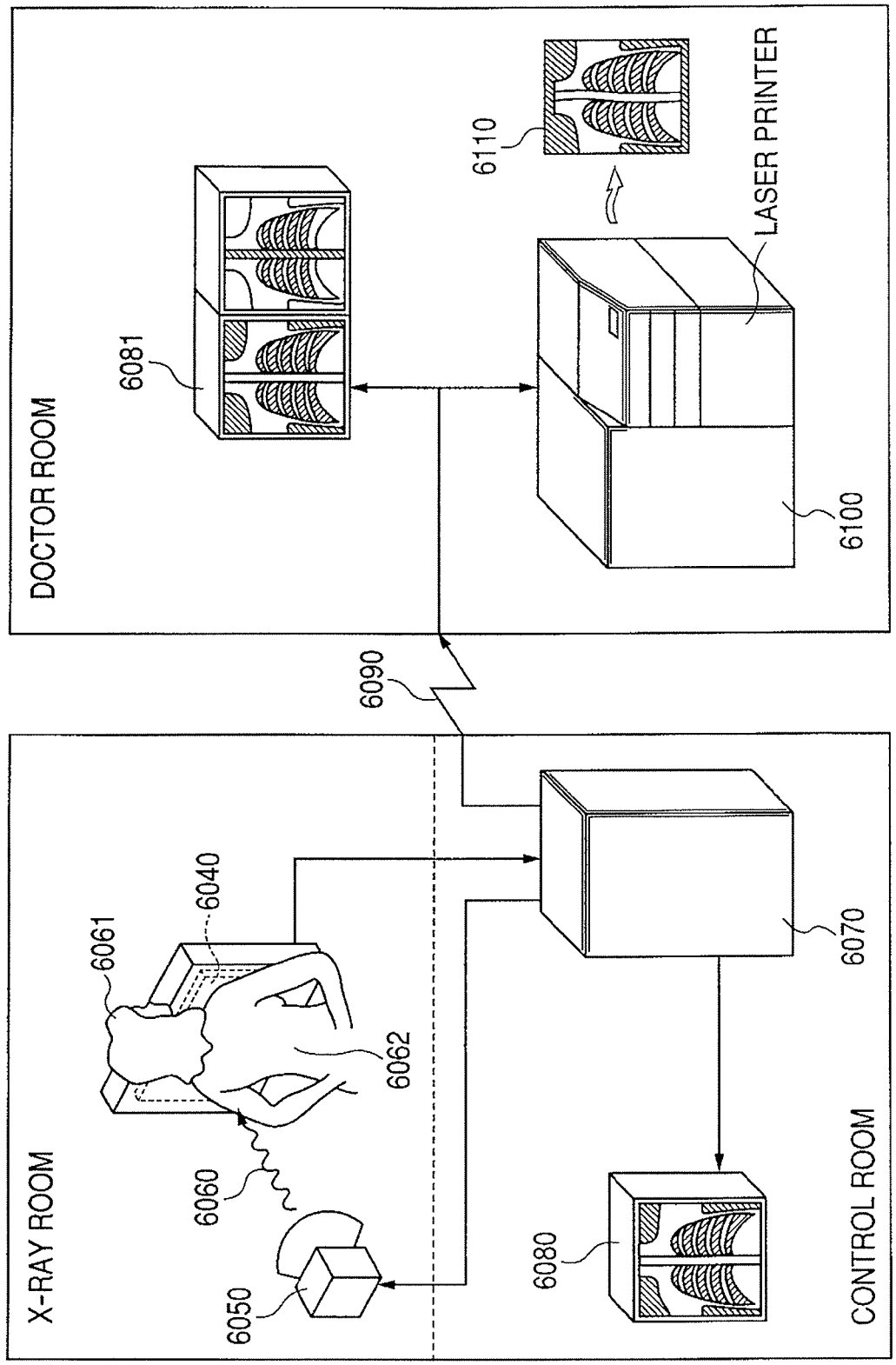
FIG. 18 is a view illustrating an example where the radiation detection apparatus of the present invention is applied as a radiation detection system.

FIG. 18 is a view illustrating an example applying a radiation detection apparatus of the present invention as a radiation detection system.

The radiation detection apparatus is the radiation detection apparatus of each of the above described embodiments.

An x-ray beam 6060 generated by an x-ray tube 6050 is transmitted through a chest region 6062 of a patient or a test subject 6061, and is incident on a radiation detection apparatus 6040 for radiographing a radiation image. This incident x-rays include information on the interior of the body of the patient 6061. Corresponding to the incidence of the x-rays, a scintillator (scintillator layer) of the radiation detection apparatus 6040 emits light, and this light is photoelectrically converted so as to obtain electrical information. This information is converted into a digital signal, and is subjected to an image processing by an image processor 6070, and can be observed by a display 6080 as a display unit existing in a control room.

Further, this information can be transferred to a remote location by transmitting means such as a telephone line 6090, and can be displayed in a display 6081 at a doctor room and the like of another location or can be stored in storing means such as an optical disk. As a result, a doctor at a remote location can make a diagnosis. Further, the information can be recorded in a film 6110 by a film processor 6100.

As many apparently widely different embodiments of the present invention can be made without departing from the spirit and scope thereof, it is to be understood that the invention is not limited to the specific embodiments thereof except as defined in the claims.

This application claims the benefit of Japanese Patent Applications No. 2006-056472, filed Mar. 2, 2006, No. 2006-056474, filed Mar. 2, 2006, No. 2006-203161, filed Jul. 26, 2006, No. 2007-046715, Feb. 27, 2007, which are hereby incorporated by reference herein in their entirety.

What is claimed is:

1. A radiation detection apparatus, comprising:
   an optical detector having a substrate and a plurality of photoelectric conversion elements arranged, on the substrate, for converting incident light into an electric signal; and
   a scintillator layer disposed on the optical detector and having a columnar crystal structure which converts radiation into light,
   wherein the concentration of an activator in the scintillator layer is higher at a radiation-incident side opposite the optical detector and is lower at the optical detector side, and
   wherein the concentration of the activator of the scintillator layer is not less than 0.7 mol % at the incident side of the radiation, and is not less than 0.3 mol % at the optical detector side and lower than the concentration at the incident side of the radiation.

2. The radiation detection apparatus according to claim 1, wherein the concentration of the activator of the scintillator layer increases in a stepped configuration from an optical detector side to the radiation-incident side.

3. The radiation detection apparatus according to claim 1, wherein the concentration of the activator of the scintillator layer increases gradually from an optical detector side to the radiation-incident side.

4. The radiation detection apparatus according to claim 1, wherein an average concentration of the activator per constant thickness of the scintillator layer increases from the optical detector side to the radiation-incident side.

5. The radiation detection apparatus according to claim 1, wherein the scintillator layer is an alkali halide phosphor.

6. The radiation detection apparatus according to claim 5, wherein the alkali halide phosphor is CsI or NaI.

7. The radiation detection apparatus according to claim 1, wherein the activator is thallium or sodium.

8. The radiation detection apparatus according to claim 1, wherein an average sectional area in the surface direction per unit thickness of the scintillator layer is larger at the radiation-incident side and is smaller at the optical detector side, and wherein the columnar crystal structure comprises a plurality of columnar crystals.

9. The radiation detection apparatus according to claim 1, wherein a moisture barrier layer comprising a doping material is disposed on the scintillator layer.

10. A method for producing a radiation detection apparatus according to claim 1, comprising a step of forming the scintillator layer by vapor deposition by controlling power or pressure supplied to a first boat, in which a main ingredient of the scintillator layer is disposed, and a second boat, in which a doping material is disposed, such that the vapor deposition of the scintillator at the radiation-incident side is conducted under a lower pressure, and the vapor deposition of the scintillator at a light-emission side is conducted under a higher pressure.

11. A method for producing a radiation detection apparatus according to claim 1, comprising a step of forming the scintillator layer by vapor deposition by controlling power or pressure supplied to a first boat, in which a main ingredient of the scintillator layer is disposed, and a second boat, in which a doping material is disposed, wherein the vapor deposition of the scintillator at the radiation-incident side is conducted under a condition of a higher power being supplied to the second boat, and the vapor deposition of the scintillator at a light emission side is conducted under a condition of a lower power being supplied to the second boat.

12. The radiation detection apparatus according to claim 1, wherein the concentration of the activator of the scintillator layer is 0.7-1.5 mol % at the radiation-incident side, and is than 0.3-1.0 mol % at the optical detector side and lower than the concentration at the radiation-incident side.

13. A scintillator panel, comprising:

a substrate; and a scintillator layer disposed on the substrate and having a columnar crystal structure for converting radiation into light, wherein radiation is incident from one surface side of the scintillator layer, and light is emitted from the other surface side of the scintillator layer, and wherein the concentration of an activator in the scintillator layer is higher at the one surface side and is lower at the other surface side, and wherein the concentration of the activator of the scintillator layer is not less than 0.7 mol % at the incident side of the radiation, and is not less than 0.3 mol % at the other surface side, which is the light-emitting side, or at which an optical detector is disposed, and lower than the concentration at the incident side of the radiation.

14. The scintillator panel according to claim 13, wherein the average sectional area in the surface direction per constant thickness of the scintillator layer is larger at the one surface side and is smaller at the other surface side.

15. The scintillator panel according to claim 13, wherein a moisture barrier layer comprising a doping material is disposed on the surface of the scintillator layer.

16. A radiation detection apparatus, comprising:

a scintillator panel according to claim 13; and an optical detector disposed on the substrate and having a plurality of photoelectric conversion elements which convert light into an electrical signal.

17. A radiation detection system, comprising:

a radiation detection apparatus according to claim 1 or 16;

signal processing means for processing a signal from the radiation detection apparatus;

recording means for recording a signal from the signal processing means;

display means for displaying a signal from the signal processing means;

transmission processing means for transmitting a signal from the signal processing means; and a radiation source for generating the radiation.

18. The method for producing a scintillator panel according to claim 13, comprising a step of forming the scintillator layer by vapor deposition by controlling power or pressure supplied to a first boat, in which a main ingredient of the scintillator layer is disposed, and a second boat, in which a doping material is disposed, such that the vapor deposition of the scintillator at the one surface side is conducted under a lower pressure, and the vapor deposition of the scintillator at the other surface side is conducted under a higher pressure.

19. The method for producing a scintillator panel according to claim 13, comprising a step of forming the scintillator layer by vapor deposition by controlling power or pressure supplied to a first boat, in which a main ingredient of the scintillator layer is disposed, and a second boat, in which a doping material is disposed, wherein the vapor deposition of the scintillator at the one surface side is conducted under a condition of a higher power being supplied to the second boat, and the vapor deposition of the scintillator at the other surface side is conducted under a condition of a lower power being supplied to the second boat.

* * * * *